US011523380B2

(12) United States Patent
Ma et al.

(10) Patent No.: US 11,523,380 B2
(45) Date of Patent: Dec. 6, 2022

(54) METHOD FOR TIME DOMAIN RESOURCE ALLOCATION ON DATA CHANNEL

(71) Applicant: Huawei Technologies Co., Ltd., Shenzhen (CN)

(72) Inventors: Ruixiang Ma, Beijing (CN); Lei Guan, Beijing (CN); Yongxia Lyu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 17/037,310

(22) Filed: Sep. 29, 2020

(65) Prior Publication Data

US 2021/0014840 A1    Jan. 14, 2021

Related U.S. Application Data

(63) Continuation of application No. PCT/CN2019/080651, filed on Mar. 29, 2019.

(30) Foreign Application Priority Data

Apr. 4, 2018   (CN) .......................... 201810299099.8

(51) Int. Cl.
  *H04W 4/00*   (2018.01)
  *H04W 72/04*   (2009.01)
  *H04L 5/00*   (2006.01)
(52) U.S. Cl.
  CPC ......... *H04W 72/042* (2013.01); *H04L 5/0094* (2013.01); *H04W 72/0446* (2013.01)

(58) Field of Classification Search
  CPC ............. H04W 72/042; H04W 5/0094; H04W 72/0446
  See application file for complete search history.

(56) References Cited

U.S. PATENT DOCUMENTS

| 2014/0146799 | A1* | 5/2014 | Park | H04W 72/042 370/336 |
| 2014/0301359 | A1* | 10/2014 | Seo | H04L 5/0094 370/330 |
| 2014/0362758 | A1* | 12/2014 | Lee | H04W 72/0446 370/312 |

(Continued)

FOREIGN PATENT DOCUMENTS

| CN | 102714562 A | 10/2012 |
| CN | 102724757 A | 10/2012 |

(Continued)

OTHER PUBLICATIONS

NTT Docomo, Inc., "DL/UL resource allocation", 3GPP TSG RAN WG1 Meeting 90bis, R1-1718216, , Oct. 9-13, 2017, 9 pages, Prague, CZ.

(Continued)

*Primary Examiner* — Abdelnabi O Musa
(74) *Attorney, Agent, or Firm* — Slater Matsil, LLP

(57) ABSTRACT

A network device sends indication information to a terminal device, to indicate a reference position of a starting symbol of a data channel. The network device sends a physical downlink control channel to the terminal device. Then the network device sends the data channel to the terminal device, or the network device receives the data channel from the terminal device.

15 Claims, 7 Drawing Sheets

(56) References Cited

U.S. PATENT DOCUMENTS

| | | | |
|---|---|---|---|
| 2017/0111888 A1* | 4/2017 | Dinan | H04L 5/0053 |
| 2018/0131482 A1* | 5/2018 | Zhou | H04W 72/1215 |
| 2019/0149365 A1* | 5/2019 | Chatterjee | H04L 5/0044 370/329 |
| 2019/0223084 A1* | 7/2019 | Wilson | H04L 5/0094 |
| 2019/0274032 A1* | 9/2019 | Chatterjee | H04W 76/11 |
| 2019/0297637 A1* | 9/2019 | Liou | H04W 72/1289 |
| 2021/0112534 A1* | 4/2021 | Dinan | H04L 27/2601 |

FOREIGN PATENT DOCUMENTS

| | | |
|---|---|---|
| CN | 103312650 A | 9/2013 |
| CN | 103875202 A | 6/2014 |
| EP | 2765724 A2 | 8/2014 |
| JP | 2020533861 A | 11/2020 |
| WO | 2011083983 A2 | 7/2011 |
| WO | 2015137648 A1 | 9/2015 |
| WO | 2019050371 A1 | 3/2019 |

OTHER PUBLICATIONS

OPPO, "Resource allocation for PDSCH/PUSCH", 3GPP TSG RAN WG1 Meeting 91, R1-1719973, Nov. 27-Dec. 1, 2017, 13 Pages, Reno, USA.

ZTE, "About dynamic indication of data transmission", 3GPP TSG RAN WG1 Meeting #89, R1-1707164, May 15-19, 2017, 6 pages, Hangzhou, P. R. China.

CMCC, "Discussion on remaining issues for time domain resource allocation", 3GPP TSG RAN WG1 Meeting #92, R1-1802043, Feb. 26-Mar. 2, 2018, 4 pages, Athens, Greece.

Huawei, HiSilicon, "Remaining issues on resource allocation and TBS", 3GPP TSG RAN WG1 Meeting #92, R1-1801343, Feb. 26-Mar. 2, 2018, 13 pages, Athens, Greece.

3GPP TS 38.214 V15.0.0 (Dec. 2017), 3rd Generation Partnership Project, Technical Specification Group Radio Access Network, NR, Physical layer procedures for data (Release 15), total 71 pages.

Huawei et al.,"PDCCH reliability for URLLC", 3GPP TSG RAN WG1 Ad Hoc Meeting, R1 -1800053, Vancouver, Canada, Jan. 22-26, 2018, total 6 pages.

Huawei et al.,"Compact DCI design for URLLC", 3GPP TSG RAN WG1 Meeting #92, R1-1801355, Athens, Greece, Feb. 26-Mar. 2, 2018, total 5 pages.

MCC Support, "Final Report of 3GPP TSG RAN WG1 #91 v1.0.0, (Reno, USA, Nov. 27-Dec. 1, 2017)", 3GPP TSG RAN WG1 Meeting #92, R1-1801301, Athens, Greece, Feb. 26-Mar. 2, 2018, total 218 pages.

"Discussion on PDSCH Start Symbol Indication," Agenda Item: 6.1.3.1.3, Resource sharing between PDCCH and PDSCH, Document for: Discussion/Decision, Source: ETRI, 3GPP TSG Ran WG1 Meeting #90, R1-1713814, Prague, P.R. Czechia, Aug. 21-25, 2017, 4 pages.

"Remaining Issues on Time Domain Resource Allocation," Agenda Item: 7.3.3.1, DL/UL Resource Allocation, Document for: Discussion/Decision, Source: ETRI, 3GPP TSG RAN WG1 Meeting AH 1801, R1-1800410, Vancouver, Canada, Jan. 22-26, 2018, 5 pages.

\* cited by examiner

METHOD FOR TIME DOMAIN RESOURCE ALLOCATION ON DATA CHANNEL

CROSS-REFERENCE TO RELATED APPLICATIONS

This application is a continuation of International Application No. PCT/CN2019/080651, filed on Mar. 29, 2019, which claims priority to Chinese Patent Application No. 201810299099.8, filed on Apr. 4, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In the prior art, a time domain resource table with a limited size is configured only by using higher layer signaling, to indicate start and length indicator values (SLIV) of all possible time domain resources. Currently, a maximum size of the table is 16, that is, a maximum of 16 combinations of starting symbols and lengths (that is, a quantity of occupied symbols) can be configured. In this case, if the reference position of the starting symbol of the data channel is constantly a slot boundary, it is equivalent to that in one slot, there are a maximum of 16 possible combinations of starting symbols and lengths for data scheduling.

Because of a high reliability requirement of an ultra-reliable and low-latency communication (URLLC) service, to ensure reliability of a control channel, a quantity of bits of the control channel needs to be reduced, and correspondingly, a quantity of bits of a time domain resource indicator field in the control channel also needs to be reduced. Therefore, a smaller time domain resource table needs to be configured. For example, four possible combinations of starting symbols and lengths can be configured. However, for the URLLC service, because a latency requirement is relatively high, a physical downlink control channel (PDCCH) may be sent on any symbol in a slot. As shown in FIG. 1, potential occasions on which the URLLC service may be scheduled in a slot are occasions 1 to 7 shown in the figure. In addition, a length of scheduled data is relatively flexible. Therefore, when a PDCCH is sent, time domain resources of a plurality of or all data channels configured by a network device are located before a time domain resource on which the PDCCH is sent. Consequently, the terminal device needs to buffer all received data before receiving the PDCCH, in which case, a buffer of the terminal device increases and power consumption of the terminal device increases.

SUMMARY

This application provides a communication method and a communications apparatus, to flexibly determine a reference position of a starting symbol of a data channel.

According to a first aspect, a communication method is provided. The method includes: receiving first indication information from a network device, where the first indication information is used to indicate a reference position of a starting symbol of a data channel; receiving a physical downlink control channel PDCCH from the network device; and receiving the data channel from the network device based on the first indication information and the PDCCH or sending the data channel to the network device based on the first indication information and the PDCCH.

In this aspect, the reference position of the starting symbol of the data channel is flexibly indicated by using the indication information, so that accurate receiving and sending of the data channel can be ensured, and a sending occasion of the PDCCH may not be limited.

With reference to the first aspect, in a first possible implementation, the reference position includes any one of the following: a slot boundary, a starting symbol of a control resource set, an ending symbol of the control resource set, a starting symbol of a control area, an ending symbol of the control area, a starting symbol of the PDCCH, and an ending symbol of the PDCCH.

With reference to the first aspect or the first possible implementation of the first aspect, in a second possible implementation, the first indication information is associated with a terminal device, or the first indication information is associated with a format of downlink control information.

In this implementation, a starting symbol of the PDCCH (or an ending symbol of the PDCCH, a starting symbol of a control resource set, an ending symbol of a control resource set, a starting symbol of a control area, or an ending symbol of a control area) is configured for a terminal device that has an emergency service transmission requirement or a relatively high transmission reliability requirement, to serve as the reference position of the starting symbol of the data channel, so that the data channel can be prevented from appearing in front of a control channel, an amount of data buffered by the terminal device can be reduced, and power consumption of the terminal device can be reduced. A slot boundary is configured for terminal devices that have a relatively low service latency requirement, to serve as the reference position, so that decrease of complexity of parsing PDCCH indication information by the terminal device can be ensured. The data channel may be received by using the slot boundary as the reference position each time, so that implementation complexity of the terminal device can be reduced. Similarly, resources can also be properly used by configuring different reference positions for different DCI formats. For example, a starting symbol of the PDCCH (or an ending symbol of the PDCCH, a starting symbol of a control resource set, an ending symbol of a control resource set, a starting symbol of a control area, or an ending symbol of a control area) is configured for a DCI format that is used to schedule an emergency service, to serve as a reference position of a starting symbol, so that the data channel can be prevented from appearing in front of a control channel, an amount of data buffered by the terminal device can be reduced, and power consumption of the terminal device can be reduced. A slot boundary is configured for DCI formats that have a relatively low latency requirement on a scheduled service, to serve as the reference position, so that decrease of complexity of parsing PDCCH indication information by the terminal device can be ensured. The data channel may be received by using the slot boundary as a reference position each time, so that implementation complexity of the terminal device can be reduced.

With reference to the first aspect, the first possible implementation of the first aspect, or the second possible implementation of the first aspect, in a third possible implementation, the method further includes: receiving higher layer signaling from the network device, where the higher layer signaling includes at least one set of an index of a starting symbol of a data channel and a quantity of symbols occupied by the data channel.

With reference to the third possible implementation of the first aspect, in a fourth possible implementation, the method further includes: when the higher layer signaling includes one set of an index S1 of a starting symbol and a quantity L of occupied symbols, determining that a configuration value S of an index of the starting symbol of the data channel is equal to S1 and a configuration value L of the quantity of symbols occupied by the data channel is equal to L1; or when the higher layer signaling includes at least two sets of indexes of starting symbols and quantities of occupied symbols, an index of a starting symbol indicated by the PDCCH is S2, and a quantity of occupied symbols is L2, determining that a configuration value S of an index of the starting symbol of the data channel is equal to S2 and a configuration value L of the quantity of symbols occupied by the data channel is equal to L2, where the index S2 of the starting symbol and the quantity L2 of occupied symbols are one set of the at least two sets of the indexes of the starting symbols and the quantities of occupied symbols.

In this implementation, when only one set of the index S1 of the starting symbol and the quantity L1 of occupied symbols are configured in the higher layer signaling, it is determined that a configuration value of the index of the starting symbol of the data channel is S1 configured in the higher layer signaling, a configuration value of the quantity of symbols occupied by the data channel is L1 configured in the higher layer signaling, and the PDCCH may not include indication information, thereby reducing bit overheads of the PDCCH. When a plurality of sets of indexes of starting symbols and quantities of occupied symbols are configured in the higher layer signaling, a configuration value of the starting symbol of the data channel and a configuration value of the quantity of occupied symbols are indicated by the PDCCH.

With reference to the fourth possible implementation of the first aspect, in a fifth possible implementation, the reference position is a slot boundary, and the receiving the data channel from the network device based on the first indication information and the PDCCH or sending the data channel to the network device based on the first indication information and the PDCCH includes: when an index T of the starting symbol of the PDCCH is greater than or equal to the configuration value S of the index of the starting symbol of the data channel, determining that a real value S(real) of the index of the starting symbol of the data channel is equal to the index T of the starting symbol of the PDCCH, and a real value L(real) of the quantity of symbols occupied by the data channel is equal to: the configuration value L of the quantity of symbols occupied by the data channel, or a smaller value between the configuration value L of the quantity of symbols occupied by the data channel and a difference between a quantity of symbols included in one slot and S(real); and receiving the data channel from the network device based on the real value of the index of the starting symbol of the data channel and the real value of the quantity of symbols occupied by the data channel or sending the data channel to the network device based on the real value of the index of the starting symbol of the data channel and the real value of the quantity of symbols occupied by the data channel.

In this implementation, an indicated slot boundary is used as the reference position. By comparing a configuration value of the index of the starting symbol of the PDCCH with the configuration value of the index of the starting symbol of the data channel, the real value of the index of the starting symbol of the data channel and the real value of the quantity of symbols occupied by the data channel can be accurately determined. Therefore, data is received accurately. When the PDCCH is located after the configuration value of the index of the starting symbol of the data channel, the real value of the index of the starting symbol of the data channel is determined according to the rule, so that it can be ensured that the data channel is always after the PDCCH, thereby reducing an amount of data buffered by the terminal device, and reducing power consumption of the terminal device. According to this rule, the real value of the quantity of occupied symbols can ensure that data scheduling is limited within one slot and does not cross a slot boundary, thereby reducing communication complexity.

With reference to the fourth possible implementation of the first aspect, in a sixth possible implementation, the reference position is a slot boundary, and the receiving the data channel from the network device based on the first indication information and the PDCCH or sending the data channel to the network device based on the first indication information and the PDCCH includes: when an index T of the starting symbol of the PDCCH is less than or equal to the configuration value S of the index of the starting symbol of the data channel, determining that a real value S(real) of the index of the starting symbol of the data channel is equal to the configuration value S of the index of the starting symbol of the data channel, and a real value L(real) of the quantity of symbols occupied by the data channel is equal to the configuration value L of the quantity of symbols occupied by the data channel; and receiving the data channel from the network device based on the real value of the index of the starting symbol of the data channel and the real value of the quantity of symbols occupied by the data channel or sending the data channel to the network device based on the real value of the index of the starting symbol of the data channel and the real value of the quantity of symbols occupied by the data channel.

In this implementation, an indicated slot boundary is used as the reference position. By comparing a configuration value of the index of the starting symbol of the PDCCH with the configuration value of the index of the starting symbol of the data channel, the real value of the index of the starting symbol of the data channel and the real value of the quantity of symbols occupied by the data channel can be accurately determined. Therefore, data is received accurately. When the PDCCH is located before the configuration value of the index of the starting symbol of the data channel, it is determined, according to this rule, that the real value of the index of the starting symbol of the data channel and the real value of the quantity of symbols occupied by the data channel are respectively equal to the configuration values, so that parsing complexity of the terminal device can be reduced.

With reference to the fourth possible implementation of the first aspect, in a seventh possible implementation, the reference position is a slot boundary, and the receiving the data channel from the network device based on the first indication information and the PDCCH or sending the data channel to the network device based on the first indication information and the PDCCH includes: when an index T of the starting symbol of the PDCCH is less than or equal to the configuration value S of the index of the starting symbol of the data channel, determining that a real value S(real) of the index of the starting symbol of the data channel is equal to the index T of the starting symbol of the PDCCH, and a real value L(real) of the quantity of symbols occupied by the data channel is equal to the configuration value L of the quantity of symbols occupied by the data channel; and receiving the data channel from the network device based on the real value of the index of the starting symbol of the data channel and the real value of the quantity of symbols occupied by the data channel or sending the data channel to the network device based on the real value of the index of the starting symbol of the data channel and the real value of the quantity of symbols occupied by the data channel.

In this implementation, an indicated slot boundary is used as the reference position. By comparing a configuration value of the index of the starting symbol of the PDCCH with the configuration value of the index of the starting symbol of the data channel, the real value of the index of the starting symbol of the data channel and the real value of the quantity of symbols occupied by the data channel can be accurately determined. Therefore, data is received accurately. When the PDCCH is located before the configuration value of the index of the starting symbol of the data channel, the real value of the index of the starting symbol of the data channel is determined according to the rule, so that it can be ensured that the data channel is closely after the PDCCH or the data channel and the PDCCH have a same starting symbol, thereby reducing latency. According to this rule, the real value of the quantity of occupied symbols can ensure that data scheduling is limited within one slot and does not cross a slot boundary, thereby reducing communication complexity.

According to a second aspect, a communication method is provided. The method includes: sending first indication information to a terminal device, where the first indication information is used to indicate a reference position of a starting symbol of a data channel; sending a physical downlink control channel PDCCH to the terminal device; and sending the data channel to the terminal device or receiving a data channel from the terminal device.

With reference to the second aspect, in a first possible implementation, the reference position includes any one of the following: a slot boundary, a starting symbol of a control resource set, an ending symbol of the control resource set, a starting symbol of a control area, an ending symbol of the control area, a starting symbol of the PDCCH, and an ending symbol of the PDCCH.

With reference to the second aspect or the first possible implementation of the second aspect, in a second possible implementation, the first indication information is associated with the terminal device, or the first indication information is associated with a format of downlink control information.

With reference to the second aspect, the first possible implementation of the second aspect, or the second possible implementation of the second aspect, in a third possible implementation, the method further includes: sending higher layer signaling to the terminal device, where the higher layer signaling includes at least one set of an index of a starting symbol of a data channel and a quantity of symbols occupied by the data channel.

With reference to the third possible implementation manner of the second aspect, in a fourth possible implementation manner, when the higher layer signaling includes one set of an index S1 of a starting symbol and a quantity L1 of occupied symbols, a configuration value S of the index of the starting symbol of the data channel is equal to S1 and a configuration value L of the quantity of symbols occupied by the data channel is equal to L1; or when the higher layer signaling includes at least two sets of indexes of starting symbols and quantities of occupied symbols, a configuration value S of an index of a starting symbol that is of a data channel and that is indicated by the PDCCH is equal to S2 and a configuration value L of a quantity of occupied symbols is equal to L2, where the index S2 of the starting symbol and the quantity L2 of occupied symbols are one set of the at least two sets of the indexes of the starting symbols and the quantities of occupied symbols.

With reference to the fourth possible implementation of the second aspect, in a fifth possible implementation, the reference position is a slot boundary; and when an index T of the starting symbol of the PDCCH is greater than or equal to the configuration value S of the index of the starting symbol of the data channel, a real value S(real) of the index of the starting symbol of the data channel is equal to the index T of the starting symbol of the PDCCH, and a real value L(real) of the quantity of symbols occupied by the data channel is equal to: the configuration value L of the quantity of symbols occupied by the data channel, or a smaller value between the configuration value L of the quantity of symbols occupied by the data channel and a difference between a quantity of symbols included in one slot and S(real).

With reference to the fourth possible implementation of the second aspect, in a sixth possible implementation, the reference position is a slot boundary; and when an index T of the starting symbol of the PDCCH is less than or equal to the configuration value S of the index of the starting symbol of the data channel, a real value S(real) of the index of the starting symbol of the data channel is equal to the configuration value S of the index of the starting symbol of the data channel, and a real value L(real) of the quantity of symbols occupied by the data channel is equal to the configuration value L of the quantity of symbols occupied by the data channel.

With reference to the fourth possible implementation of the second aspect, in a seventh possible implementation, the reference position is a slot boundary; and when an index T of the starting symbol of the PDCCH is less than or equal to the configuration value S of the index of the starting symbol of the data channel, a real value S(real) of the index of the starting symbol of the data channel is equal to the index T of the starting symbol of the PDCCH, and a real value L(real) of the quantity of symbols occupied by the data channel is equal to the configuration value L of the quantity of symbols occupied by the data channel.

According to a third aspect, a communication method is provided. The method includes: receiving configuration value information of a starting symbol of a data channel and configuration value information of a quantity of occupied symbols from a network device; determining a real value of the starting symbol of the data channel and a real value of the quantity of occupied symbols based on the configuration value information of the starting symbol of the data channel and the configuration value information of the quantity of occupied symbols; and receiving the data channel from the network device based on the real value of the starting symbol of the data channel and the real value of the quantity of occupied symbols or sending the data channel to the network device based on the real value of the starting symbol of the data channel and the real value of the quantity of occupied symbols.

In this aspect, the real value of the starting symbol of the data channel and the real value of the quantity of occupied symbols are accurately determined, so that the data channel can be sent or received at an accurate time domain position.

With reference to the third aspect, for another possible implementation, refer to the fourth possible implementation of the first aspect to the sixth possible implementation of the first aspect. Details are not described herein again.

According to a fourth aspect, a communication method is provided. The method includes: sending configuration value information of a starting symbol of a data channel and configuration value information of a quantity of occupied symbols to a terminal device; and sending the data channel to the terminal device or receiving a data channel from the terminal device.

With reference to the fourth aspect, for another possible implementation, refer to the fourth possible implementation of the second aspect to the sixth possible implementation of the second aspect. Details are not described herein again.

According to a fifth aspect, a communication method is provided. The method includes: receiving a frequency domain resource indication value (RIV) of a data channel from a network device, where the RIV is used to indicate a frequency domain resource position of the data channel, the RIV is related to a quantity NBS of resource block groups (RBGs) in a bandwidth part (BWP), and N is related to a quantity NB, of RBs included in the BWP and an RBG size P; determining a frequency domain resource position of the data channel based on the RIV; and sending the data channel to the network device on the frequency domain resource or receiving a data channel from the network device on the frequency domain resource.

In this aspect, the frequency domain resource indication value of the data channel is related to the quantity of resource block groups in the bandwidth part, so that bit overheads for sending the frequency domain resource indication value can be reduced.

With reference to the fifth aspect, in a first possible implementation, the method further includes: receiving first indication information from the network device, where the first indication information is used to indicate one of at least two RBG sizes corresponding to a range of the quantity of RBs included in the BWP.

In this implementation, the range of the quantity of RBs included in the BWP corresponds to the at least two RBG sizes. A corresponding RBG size may be determined based on a specific range of the quantity of RBs included in the BWP.

With reference to the fifth aspect or the first possible implementation of the fifth aspect, in a second possible implementation, when the quantity of RBs included in the BWP ranges from 1 to 36, two corresponding RBG sizes are 4 and 8; when the quantity of RBs included in the BWP ranges from 37 to 72, two corresponding RBG sizes are 8 and 16; when the quantity of RBs included in the BWP ranges from 73 to 144, two corresponding RBG sizes are 16 and 32; or when the quantity of RBs included in the BWP ranges from 145 to 275, two corresponding RBG sizes are 32 and 32.

Alternatively, when the quantity of RBs included in the BWP ranges from 1 to 36, two corresponding RBG sizes are 2 and 4; when the quantity of RBs included in the BWP ranges from 37 to 72, two corresponding RBG sizes are 4 and 8; when the quantity of RBs included in the BWP ranges from 73 to 144, two corresponding RBG sizes are 8 and 16; or when the quantity of RBs included in the BWP ranges from 145 to 275, two corresponding RBG sizes are 16 and 16.

With reference to the fifth aspect or the first possible implementation of the fifth aspect, in a third possible implementation, P is a size of a first RBG corresponding to the range of the quantity of RBs included in the BWP.

In this implementation, it is specified that the range of the quantity of RBs included in the BWP corresponds to a first configured RBG size. For example, the first RBG size may be an RBG size with a larger value between or a largest value among the at least two RBG sizes corresponding to the range of the quantity of RBs included in the BWP. Therefore, a frequency domain resource indication value is reduced, and bit overheads for indicating a frequency domain resource are reduced.

With reference to the fifth aspect, in a fourth possible implementation, a range of a quantity of RBs included in each BWP corresponds to one RBG size.

In this implementation, a range of a quantity of RBs included in each BWP corresponds to one RBG size. There is no need to set the range of the quantity of RBs included in each BWP to corresponding to a plurality of RBG sizes, and one RBG size corresponding to the range of the quantity of RBs included in each BWP may be set relatively large. Therefore, the frequency domain resource indication value is reduced, and bit overheads for indicating a frequency domain resource are reduced. In addition, the RBG size may be directly determined based on the range of the quantity of RBs included in the BWP, and no additional indication information is required, thereby reducing signaling overheads.

With reference to the fifth aspect, in a fifth possible implementation, P is a fixed value predefined in a protocol.

In this implementation, P is a fixed value, for example, fixed to 8, 16, or 32, and is irrelevant to the range of the quantity of RBs included in each BWP. Therefore, implementation is simple.

With reference to the fifth aspect, in a sixth possible implementation, the method further includes: receiving P from the network device.

In this implementation, P may be set by the network device, and the network device notifies a terminal device of determined P. Therefore, implementation is flexible.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, or the sixth possible implementation of the fifth aspect, in a seventh possible implementation, the RIV is determined by using the following formula:

if $(L_{RBG}-1) \leq \lfloor N_{BWP}^{RBG}/2 \rfloor$, then $RIV = N_{BWP}^{RGP}(L_{RBG}-1) + RBG_{start}$ else $RIV = N_{BWP}^{RGP}(N_{BWP}^{RGP} - L_{RBG}+1) + (N_{BWP}^{RGP}-1-RBG_{start})$ where $L_{RBG}$ represents a quantity of RBGs occupied by a frequency domain of a data channel, and $L_{RBG} \geq 1$; $N_{BWP}^{RGP} = \lceil N_{BWP}^{size}/P \rceil$, and represents a quantity of RBGs in a BWP; $N_{BWP}^{size}$ is a quantity of RBs included in the BWP, and P is an RBG size, namely, a quantity of RBs included in one RBG; $RBG_{start}$ is a starting RBG number of the frequency domain of the data channel; and $L_{RBG} \leq N_{BWP}^{RGP} - RBG_{start}$.

In this implementation, the frequency domain resource indication value of the data channel is related to the quantity of resource block groups in the bandwidth part, so that bit overheads for sending the frequency domain resource indication value can be reduced.

According to a sixth aspect, a communication method is provided. The method includes: determining a frequency domain resource indication value RIV of a data channel, where the RIV is used to indicate a frequency domain resource position of the data channel, the RIV is related to a quantity $N_{BWP}^{RGP}$ of resource block groups RBGs in a bandwidth part BWP, and $N_{BWP}^{RGP}$ is related to a quantity $N_{BWP}^{size}$ of RBs included in the BWP and an RBG size P; sending the RIV to a terminal device; and sending the data channel to the terminal device at the frequency domain resource position indicated by the RIV or receiving a data channel from the terminal device at the frequency domain resource position.

With reference to the sixth aspect, in a first possible implementation, the method further includes: sending first indication information to the terminal device, where the first indication information is used to indicate one of at least two RBG sizes corresponding to a range of the quantity of RBs included in the BWP.

With reference to the sixth aspect or the first possible implementation of the sixth aspect, in a second possible implementation, when the quantity of RBs included in the BWP ranges from 1 to 36, two corresponding RBG sizes are 4 and 8; when the quantity of RBs included in the BWP ranges from 37 to 72, two corresponding RBG sizes are 8 and 16; when the quantity of RBs included in the BWP ranges from 73 to 144, two corresponding RBG sizes are 16 and 32; or when the quantity of RBs included in the BWP ranges from 145 to 275, two corresponding RBG sizes are 32 and 32.

Alternatively, when the quantity of RBs included in the BWP ranges from 1 to 36, two corresponding RBG sizes are 2 and 4; when the quantity of RBs included in the BWP ranges from 37 to 72, two corresponding RBG sizes are 4 and 8; when the quantity of RBs included in the BWP ranges from 73 to 144, two corresponding RBG sizes are 8 and 16; or when the quantity of RBs included in the BWP ranges from 145 to 275, two corresponding RBG sizes are 16 and 16.

With reference to the sixth aspect or the first possible implementation of the sixth aspect, in a third possible implementation, P is a size of a first RBG corresponding to the range of the quantity of RBs included in the BWP.

With reference to the sixth aspect, in a fourth possible implementation, a range of a quantity of RBs included in each BWP corresponds to one RBG size.

With reference to the sixth aspect, in a fifth possible implementation, P is a fixed value predefined in a protocol.

With reference to the sixth aspect, in a sixth possible implementation, the method further includes: sending P to the terminal device.

With reference to the sixth aspect, the first possible implementation of the sixth aspect, the second possible implementation of the sixth aspect, the third possible implementation of the sixth aspect, the fourth possible implementation of the sixth aspect, the fifth possible implementation of the sixth aspect, or the sixth possible implementation of the sixth aspect, in a seventh possible implementation, the RIV is determined by using the following formula:

if $(L_{RBG}-1) \leq \lfloor N_{BWP}^{RBG}/2 \rfloor$, then $RIV = N_{BWP}^{RGP}(L_{RBG}-1) + RBG_{start}$ else $RIV = N_{BWP}^{RGP}(N_{BWP}^{RGP}-L_{RBG}+1) + (N_{BWP}^{RGP}-1-RBG_{start})$ where $L_{RBG}$ represents a quantity of RBGs occupied by a frequency domain of a data channel, and $L_{RBG} \geq 1$; $N_{BWP}^{RGP} = \lceil N_{BWP}^{size}/P \rceil$, and represents a quantity of RBGs in a BWP; $N_{BWP}^{size}$ is a quantity of RBs included in the BWP, and P is an RBG size, namely, a quantity of RBs included in one RBG; $RBG_{start}$ is a starting RBG number of the frequency domain of the data channel; and $L_{RBG} \leq N_{BWP}^{RGP} - RBG_{start}$.

According to a seventh aspect, a communications apparatus is provided, and can implement the communication method in the first aspect, the third aspect, or the fifth aspect. For example, the communications apparatus may be a chip (such as a baseband chip or a communications chip) or a terminal device. The foregoing method may be implemented by using software, hardware, or hardware executing corresponding software.

In a possible implementation, a structure of the communications apparatus includes a processor and a memory. The processor is configured to support the apparatus in performing a corresponding function in the foregoing communication method. The memory is configured to couple to the processor, and the memory stores a necessary program (instruction) and/or necessary data of the apparatus. Optionally, the communications apparatus may further include a communications interface, configured to support communication between the apparatus and another network element.

In another possible implementation, the communications apparatus may include a unit or a module for performing a corresponding action in the foregoing method.

In still another possible implementation, a processor and a transceiver apparatus are included. The processor is coupled to the transceiver apparatus. The processor is configured to execute a computer program or instruction, to control the transceiver apparatus to send and receive information; and when the processor executes the computer program or instruction, the processor is further configured to implement the foregoing method. The transceiver apparatus may be a transceiver, a transceiver circuit, or an input/output interface. When the communications apparatus is a chip, the transceiver apparatus is a transceiver circuit or an input/output interface.

When the communications apparatus is a chip, a sending unit may be an output unit, for example, an output circuit or a communications interface; and a receiving unit may be an input unit, for example, an input circuit or a communications interface. When the communications apparatus is a network device, a sending unit may be a transmitter or a transmitter machine, and a receiving unit may be a receiver or a receiver machine.

According to an eighth aspect, a communications apparatus is provided, and can implement the communication method in the second aspect, the fourth aspect, or the sixth aspect. For example, the communications apparatus may be a chip (such as a baseband chip or a communications chip) or a network device. The foregoing method may be implemented by using software, hardware, or hardware executing corresponding software.

In a possible implementation, a structure of the communications apparatus includes a processor and a memory. The processor is configured to support the apparatus in performing a corresponding function in the foregoing communication method. The memory is configured to couple to the processor, and the memory stores a necessary program (instruction) and necessary data of the apparatus. Optionally, the communications apparatus may further include a communications interface, configured to support communication between the apparatus and another network element.

In another possible implementation, the communications apparatus may include a unit or a module for performing a corresponding action in the foregoing method.

In still another possible implementation, a processor and a transceiver apparatus are included. The processor is coupled to the transceiver apparatus. The processor is configured to execute a computer program or instruction, to control the transceiver apparatus to send and receive information; and when the processor executes the computer program or instruction, the processor is further configured to implement the foregoing method. The transceiver apparatus may be a transceiver, a transceiver circuit, or an input/output interface. When the communications apparatus is a chip, the transceiver apparatus is a transceiver circuit or an input/output interface.

When the communications apparatus is a chip, a receiving unit may be an input unit, for example, an input circuit or a communications interface; and a sending unit may be an output unit, for example, an output circuit or a communications interface. When the communications apparatus is a terminal device, a receiving unit may be a receiver (which may also be referred to as a receiver machine), and a sending unit may be a transmitter (which may also be referred to as a transmitter machine).

According to a ninth aspect, a computer-readable storage medium is provided. The computer-readable storage medium stores a computer program or instruction. When the computer program or instruction is executed, the methods in the foregoing aspects are implemented.

According to a tenth aspect, a computer program product including an instruction is provided. When the instruction is run on a computer, the computer is enabled to perform the method according to any one of the foregoing aspects.

BRIEF DESCRIPTION OF THE DRAWINGS

To describe technical solutions in embodiments or the background of the present invention more clearly, the following describes the accompanying drawings required for describing the embodiments or the background of the present invention.

DETAILED DESCRIPTION OF ILLUSTRATIVE EMBODIMENTS

The following describes embodiments of the present invention with reference to the accompanying drawings in the embodiments of the present invention.

Figure 1:
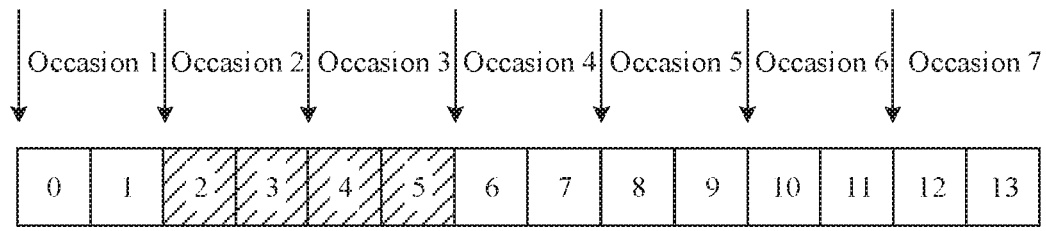
FIG. 1 is a schematic diagram of potential occasions on which a URLLC service may be scheduled in a slot.
Figure 2:
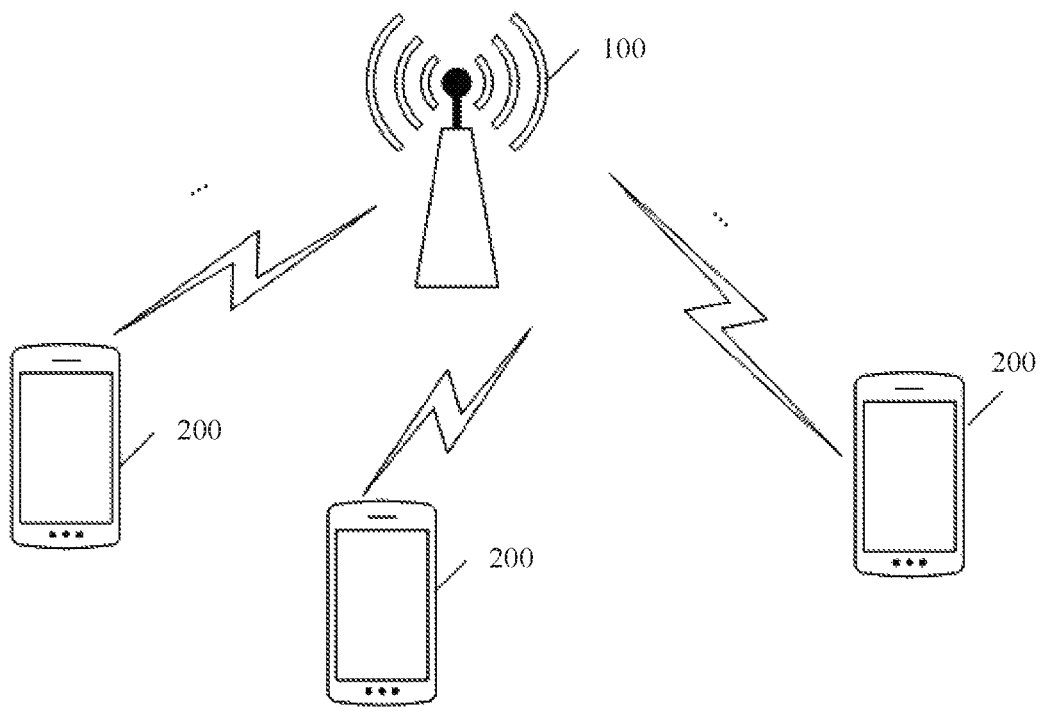
FIG. 2 is a schematic diagram of a communications system according to an embodiment of this application.

FIG. 2 is a schematic diagram of a communications system according to this application. The communications system may include at least one network device 100 (only one network device is shown) and one or more terminal devices 200 connected to the network device 100.

The network device 100 may be a device that can communicate with the terminal device 200. The network device 100 may be any device with a wireless transceiver function, and includes but is not limited to a base station NodeB, an evolved NodeB (eNodeB), a base station in a fifth generation (5G) communications system, a base station or network device in a future communications system, an access node in a Wi-Fi system, a wireless relay node, a wireless backhaul node, and the like. The network device 100 may alternatively be a radio controller in a cloud radio access network (CRAN) scenario. The network device 100 may alternatively be a small cell, a transmission node (TRP), or the like. A specific technology and a specific device form that are used by the network device are not limited in the embodiments of this application.

The terminal device 200 is a device having a wireless transceiver function, may be deployed on land, and includes an indoor device, an outdoor device, a handheld device, a wearable device, or a vehicle-mounted device; or may be deployed on a water surface, for example, on a ship; or may be deployed in the air, for example, on a plane, a balloon, or a satellite. The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in a telemedicine (remote medical), a wireless terminal in a smart grid, a wireless terminal in transportation safety, a wireless terminal in a smart city, a wireless terminal in a smart home, and the like. An application scenario is not limited in the embodiments of this application. The terminal device may sometimes be referred to as user equipment (UE), an access terminal device, a UE unit, a mobile station, a mobile console, a remote station, a remote terminal device, a mobile device, a terminal, a wireless communications device, a UE agent, a UE apparatus, or the like.

It should be noted that the terms "system" and "network" may be used interchangeably in the embodiments of the present invention. "A plurality of" means two or more. In view of this, "a plurality of" may also be understood as "at least two" in the embodiments of the present invention. The term "and/or" describes an association relationship of associated objects and represents that three relationships may exist. For example, A and/or B may represent the following three cases: Only A exists, both A and B exist, and only B exists. In addition, the character "/" generally represents an "or" relationship between the associated objects.

This application provides a communication method and a communications apparatus. A reference position of a starting symbol of a data channel is flexibly indicated by using indication information, so that accurate receiving and sending of the data channel can be ensured, and a sending occasion of a PDCCH may not be limited.

Figure 3:
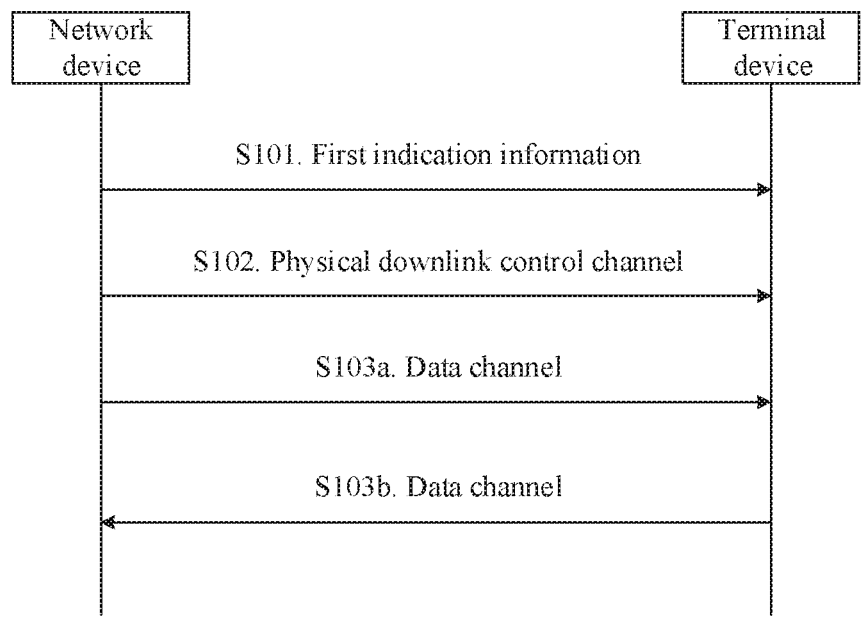
FIG. 3 is a schematic interaction flowchart of a communication method according to an embodiment of this application.

FIG. 3 is a schematic interaction flowchart of a communication method according to an embodiment of this application. The method may include the following steps.

S101. A network device sends first indication information to a terminal device, where the first indication information is used to indicate a reference position of a starting symbol of a data channel; and the terminal device receives the first indication information.

S102. The network device sends a PDCCH to the terminal device; and the terminal device receives the PDCCH.

S103a. The network device sends a data channel to the terminal device based on the first indication information and the PDCCH; and the terminal device receives the data channel.

S103b. The terminal device sends a data channel to the network device based on the first indication information and the PDCCH; and the network device receives the data channel.

The network device sends the PDCCH. The PDCCH includes time domain resource indication information, and may further include frequency domain resource indication information, a modulation and coding scheme (MCS) used for communication, and the like. This embodiment mainly relates to indication of a time domain resource. The time domain resource indication information is used to indicate an index, in a first time domain resource set, of a first time domain resource occupied by a physical downlink shared channel (PDSCH) or a physical uplink shared channel (PUSCH).

A time domain position of data may be indicated by using an SLIV. Specifically, a start position may be an index of the starting symbol of the data channel, and a length indicator value may be a quantity of symbols occupied by the data channel. The first time domain resource set includes indexes of starting symbols of one or more groups of data channels and a quantity of symbols occupied by the data channel. The network device may send higher layer signaling, to preconfigure the first time domain resource set for the terminal device. A symbol in this application may also be referred to as a time-domain symbol. The time-domain symbol herein may be an orthogonal frequency division multiplexing (OFDM) symbol, or may be a discrete Fourier transform spread orthogonal frequency division multiplexing (DFTS-OFDM) symbol.

Downlink data is used as an example. First, a table (where a quantity n of rows in the table is less than or equal to 16) is configured by using higher layer signaling, and the table includes the first time domain resource set. The higher layer signaling may be radio resource control (RRC) signaling, medium access control (MAC) layer signaling, or the like, as shown in Table 1 below. Table 1 shows examples of the first time domain resource set.

TABLE 1

| Index | (start, length) |
|-------|-----------------|
| o     | SLIV 1          |
| ...   | ...             |
| n     | SLIV n          |

In Table 1, start is an absolute value of the index of the starting symbol of a time domain (for example, in a slot) of the data channel, and length is an absolute value of the quantity of symbols occupied by the data channel. Start and length may be calculated by using a formula, to obtain the SLIV. Each SLIV may correspond to one index.

For example, assuming that the starting symbol of the data channel uses a slot boundary as the reference position, the SLIV may be obtained by using the following formula 1:

if $(L-1) \leq 7$, then $SLIV = 14 \cdot (L-1) + S$ else $SLIV = 14 \cdot (14-L+1) + (14-1-S)$ where $0 < L \leq 14-S$                    Formula (1)

The network device further sends the PDCCH to the terminal device. The time domain resource indication information indicated by the PDCCH may include an index in Table 1, and the index is used to indicate a used SLIV, so that the terminal device can derive start and length based on the SLIV.

As shown in Table 1, a time domain resource table with a limited size is configured only by using the higher layer signaling, to indicate start and length indicator values of all possible time domain resources. Currently, a maximum size of the table is 16, that is, a maximum of 16 combinations of starting symbols and lengths can be configured. In this case, if the reference position of the starting symbol of the data channel is constantly a slot boundary, it is equivalent to that in one slot, there are a maximum of 16 possible combinations of starting symbols and lengths for data scheduling. However, for a URLLC service, because a latency requirement is relatively high, the PDCCH may be sent on any symbol in a slot, and a length of scheduled data is relatively flexible. Therefore, when a PDCCH is sent, time domain resources of a plurality of or all data channels configured by the network device are located before a time domain resource on which the PDCCH is sent. Consequently, the terminal device needs to buffer all received data before receiving the PDCCH, in which case, a buffer of the terminal device increases and power consumption of the terminal device increases. Therefore, determining the reference position of the starting symbol is very important.

In this embodiment, in S101, the network device sends the first indication information to the terminal device, where the first indication information is used to indicate the reference position of the starting symbol S of the data channel. The reference position includes any one of the following: a slot boundary, a starting symbol of a control resource set (CORESET), an ending symbol of the control resource set, a starting symbol of a control area, an ending symbol of the control area, a starting symbol of the PDCCH, and an ending symbol of the PDCCH. The CORESET is a set of resources including one or more PDCCHs, and the control area is a set of resources including a PDCCH, and may include one or more CORESETs. The first indication information may be carried in the higher layer signaling, for example, RRC signaling or MAC signaling, or carried in physical layer dynamic signaling, for example, a PDCCH.

The reference position indicating the starting symbol may be selected based on different application scenarios. For example, if the terminal device is scheduled to perform an emergency service or a service with a relatively high transmission reliability requirement, it may be indicated that the reference position of the starting symbol is a starting symbol of the PDCCH, an ending symbol of the PDCCH, a starting symbol of a control resource set, an ending symbol of the control resource set, a starting symbol of a control area, or an ending symbol of the control area, so that the data channel can be prevented from appearing in front of a control channel, an amount of data buffered by the terminal device can be reduced, and power consumption of the terminal device can be reduced. If the terminal device is scheduled to perform a service with a relatively low latency requirement, it may be indicated that a slot boundary is used as the reference position, so that decrease of complexity of parsing PDCCH indication information by the terminal device can be ensured. The data channel may be received by using the slot boundary as the reference position each time, so that implementation complexity of the terminal device can be reduced. Further, in an implementation, the first indication information may be associated with the terminal device. For example, different reference positions of starting symbols of data channels are indicated for different terminal devices.

For example, a starting symbol of the PDCCH, an ending symbol of the PDCCH, a starting symbol of a control resource set, an ending symbol of the control resource set, a starting symbol of a control area, or an ending symbol of the control area is indicated to a terminal device that has an emergency service transmission requirement or a relatively high transmission reliability requirement, to serve as the reference position of the starting symbol of the data channel, so that the data channel can be prevented from appearing in front of a control channel, an amount of data buffered by the terminal device can be reduced, and power consumption of the terminal device can be reduced. A slot boundary is indicated to terminal devices that have a relatively low service latency requirement, to serve as the reference position, so that decrease of complexity of parsing PDCCH indication information by the terminal device can be ensured. The data channel may be received by using the slot boundary as the reference position each time, so that implementation complexity of the terminal device can be reduced.

In another implementation, the first indication information may be associated with a format of downlink control information. For example, different reference positions of starting symbols are configured for different DCI formats.

For example, resources can also be properly used by configuring different reference positions for different DCI formats. For example, a starting symbol of the PDCCH, an ending symbol of the PDCCH, a starting symbol of a control resource set, an ending symbol of the control resource set, a starting symbol of a control area, or an ending symbol of the control area is indicated to a DCI format that is used to schedule an emergency service, to serve as a reference position of a starting symbol, so that the data channel can be prevented from appearing in front of a control channel, an amount of data buffered by the terminal device can be reduced, and power consumption of the terminal device can be reduced. A slot boundary is indicated to DCI formats that have a relatively low latency requirement on a scheduled service, to serve as the reference position, so that decrease of complexity of parsing PDCCH indication information by the terminal device can be ensured. The data channel may be received by using the slot boundary as a reference position each time, so that implementation complexity of the terminal device can be reduced. A DCI format of the emergency service may be a DCI format for scheduling the URLLC service. For another example, a starting symbol of the PDCCH, an ending symbol of the PDCCH, a starting symbol of a control resource set, an ending symbol of the control resource set, a starting symbol of a control area, or an ending symbol of the control area is indicated to compact downlink control information (compact DCI) or a DCI format with a relatively small quantity of bits, to serve as the reference position of the starting symbol. Further, as described above, the time domain resource set may be one row, to be specific, the higher layer signaling includes a set of an index S1 of a starting symbol and a quantity L1 of occupied symbols. To reduce bit overheads of control information carried on the PDCCH, the PDCCH may not include indication information of the time domain, and the terminal device sends the data channel to the network device by using, by default, the set of the index S1 of the starting symbol and the quantity L1 of occupied symbols that are configured in the higher layer signaling, or demodulates and decodes the received data channel. Alternatively, the PDCCH may include one bit, used to indicate an index of the SLIV. Regardless of whether the PDCCH performs indication, if the time domain resource set includes only one set of the index S1 of the starting symbol and the quantity L1 of occupied symbols, the terminal device may determine that a configuration value S of the index of the starting symbol of the data channel is equal to S1 and a configuration value L of the quantity of symbols occupied by the data channel is equal to L1.

When the higher layer signaling includes at least two sets of indexes of starting symbols and quantities of occupied symbols, an index of a starting symbol indicated by the PDCCH is S2, and a quantity of occupied symbols is L2, the terminal device may determine that a configuration value S of an index of the starting symbol of the data channel is equal to S2 and a configuration value L of the quantity of symbols occupied by the data channel is equal to L2, where S2 and L2 are one set of the at least two sets of the indexes of the starting symbols and the quantities of occupied symbols.

Further, when the reference position is a slot boundary, because a service such as a low-latency and high-reliability service requires relatively frequent blind detection on the PDCCH, and the PDCCH may be sent at many occasions, the starting symbol or the ending symbol of the PDCCH, the starting symbol or the ending symbol of the CORESET, or the starting symbol or the ending symbol of the control area may be before the starting symbol of the data channel, or may be after the starting symbol of the data channel. Therefore, a real value S(real) of the index of the starting symbol of the data channel and a real value L(real) of the quantity of symbols occupied by the data channel may be determined based on a value relationship between the index T of the starting symbol of the PDCCH and the configuration value S of the index of the starting symbol of the data channel.

Specifically, in an implementation, when the reference position of the starting symbol is a slot boundary, the network device may configure that when the index T of the starting symbol or the ending symbol of the PDCCH, the starting symbol or the ending symbol of the CORESET, or the starting symbol or the ending symbol of the control area is greater than or equal to the configuration value S of the index of the starting symbol of the data channel, the real value S(real) of the index of the starting symbol of the data channel is equal to the index T of the starting symbol of the PDCCH, and the real value L(real) of the quantity of symbols occupied by the data channel is equal to: the configuration value L of the quantity of symbols occupied by the data channel, or a smaller value between the configuration value L of the quantity of symbols occupied by the data channel and a difference between a quantity of symbols included in one slot and S(real). In other words, the network device sends the PDCCH to indicate the configuration value of the index of the starting symbol of the data channel and the configuration value of the quantity of occupied symbols, and sends the data channel to the terminal device based on the real value of the index of the starting symbol of the data channel and the real value of the quantity of occupied symbols, or receives a data channel from the terminal device based on the real value of the index of the starting symbol of the data channel and the real value of the quantity of occupied symbols.

The terminal device may determine, based on the reference position of the starting symbol and the PDCCH, that the real value S(real) of the index of the starting symbol of the data channel is the index T of the starting symbol or the ending symbol of the PDCCH, the starting symbol or the ending symbol of the CORESET, or the starting symbol or the ending symbol of the control area; and determine that the real value L(real) of the quantity of symbols occupied by the data channel is: the configuration value L of the quantity of symbols occupied by the data channel, or a smaller value between the configuration value L of the quantity of symbols occupied by the data channel and a difference between a quantity of symbols included in one slot and S(real). That is, L(real) may be the configuration value L, or may be determined based on S(real): a smaller value between the configuration value L of the quantity of symbols occupied by the data channel and a difference between the quantity of symbols included in one slot and S(real). In addition, the terminal device demodulates and decodes the data channel based on the real value of the index of the starting symbol of the data channel and the real value of the quantity of symbols occupied by the data channel.

When the PDCCH is located after the configuration value of the index of the starting symbol of the data channel, the real value of the index of the starting symbol of the data channel is determined according to the rule, so that it can be ensured that the data channel is always after the PDCCH, thereby reducing an amount of data buffered by the terminal device, and reducing power consumption of the terminal device. According to this rule, the real value of the quantity of occupied symbols can ensure that data scheduling is limited within one slot and does not cross a slot boundary, thereby reducing communication complexity.

In another implementation, when the reference position of the starting symbol is a slot boundary, the network device may configure that when the index T of the starting symbol or the ending symbol of the PDCCH, the starting symbol or the ending symbol of the CORESET, or the starting symbol or the ending symbol of the control area is less than or equal to the configuration value S of the index of the starting symbol of the data channel, the real value S(real) of the index of the starting symbol of the data channel is equal to the configuration value S of the index of the starting symbol of the data channel, and the real value L(real) of the quantity of symbols occupied by the data channel is equal to the configuration value L of the quantity of symbols occupied by the data channel.

The terminal device may determine, based on the reference position of the starting symbol and the PDCCH, that the real value S(real) of the index of the starting symbol of the data channel is equal to the configuration value S of the index of the starting symbol of the data channel, and the real value L(real) of the quantity of symbols occupied by the data channel is equal to the configuration value L of the quantity of symbols occupied by the data channel; and demodulate and decode the data channel based on the real value of the index of the starting symbol of the data channel and the real value of the quantity of symbols occupied by the data channel.

When the PDCCH is located before the configuration value of the index of the starting symbol of the data channel, it is determined, according to this rule, that the real value of the index of the starting symbol of the data channel and the real value of the quantity of symbols occupied by the data channel are respectively equal to the configuration values, so that parsing complexity of the terminal device can be reduced.

In still another implementation, when the reference position of the starting symbol is a slot boundary, the network device may configure that when the index T of the starting symbol or the ending symbol of the PDCCH, the starting symbol or the ending symbol of the CORESET, or the starting symbol or the ending symbol of the control area is less than or equal to the configuration value S of the index of the starting symbol of the data channel, the real value S(real) of the index of the starting symbol of the data channel is equal to the index T of the starting symbol or the ending symbol of the PDCCH, the starting symbol or the ending symbol of the CORESET, or the starting symbol or the ending symbol of the control area, and the real value L(real) of the quantity of symbols occupied by the data channel is equal to the configuration value L of the quantity of symbols occupied by the data channel.

The terminal device may determine, based on the reference position of the starting symbol and the PDCCH, that the real value S(real) of the index of the starting symbol of the data channel is equal to the index T of the starting symbol of the PDCCH, and the real value L(real) of the quantity of symbols occupied by the data channel is equal to the configuration value L of the quantity of symbols occupied by the data channel; and demodulate and decode the data channel based on the real value of the index of the starting symbol of the data channel and the real value of the quantity of symbols occupied by the data channel.

When the PDCCH is located before the configuration value of the index of the starting symbol of the data channel, the real value of the index of the starting symbol of the data channel is determined according to the rule, so that it can be ensured that the data channel is closely after the PDCCH or the data channel and the PDCCH have a same starting symbol, thereby reducing latency. According to this rule, the real value of the quantity of occupied symbols can ensure that data scheduling is limited within one slot and does not cross a slot boundary, thereby reducing communication complexity.

In foregoing implementation, an indicated slot boundary is used as the reference position. By comparing the configuration value of the index of the starting symbol of the PDCCH with the configuration value of the index of the starting symbol of the data channel, the real value of the index of the starting symbol of the data channel and the real value of the quantity of symbols occupied by the data channel can be accurately determined. Therefore, the data channel is sent accurately, or the received data channel is demodulated and decoded.

According to the communication method provided in this embodiment of this application, the reference position of the starting symbol of the data channel is flexibly indicated by using indication information, so that accurate receiving and sending of the data channel can be ensured, and a sending occasion of the PDCCH may not be limited.

Figure 4:
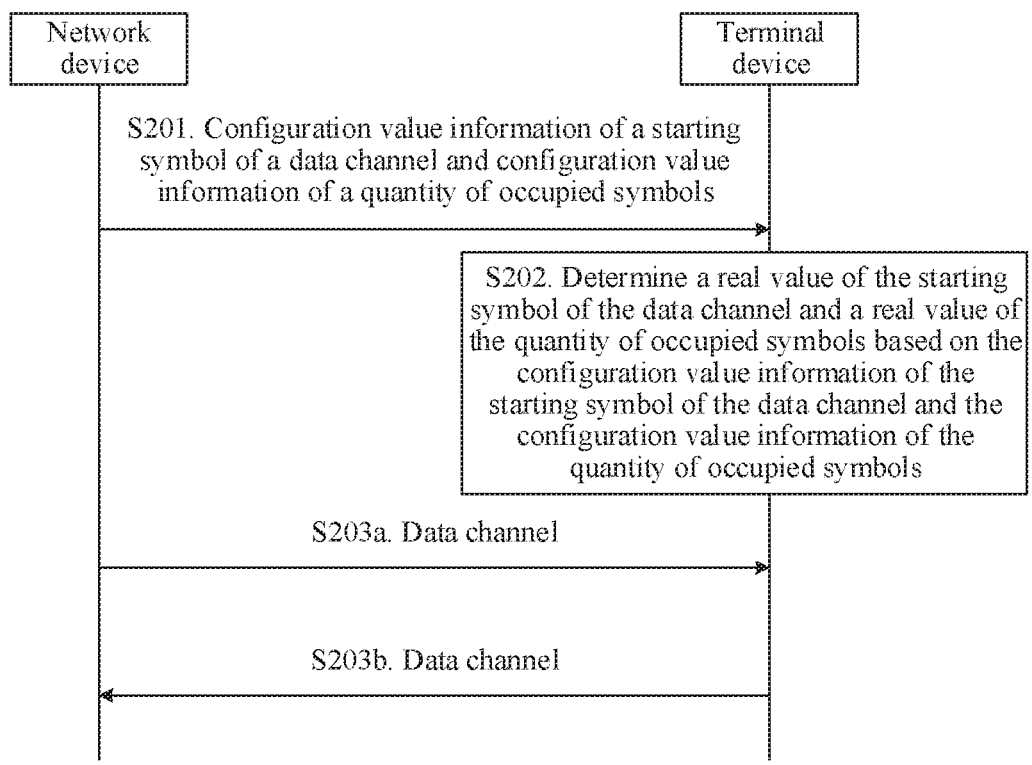
FIG. 4 is a schematic interaction flowchart of another communication method according to an embodiment of this application.

FIG. 4 is a schematic flowchart of another communication method according to an embodiment of this application. The method may include the following steps.

S201. A network device sends configuration value information of a starting symbol of a data channel and configuration value information of a quantity of occupied symbols to a terminal device; and the terminal device receives the configuration value information.

S202. The terminal device determines a real value of the starting symbol of the data channel and a real value of the quantity of occupied symbols based on the configuration value information of the starting symbol of the data channel and the configuration value information of the quantity of occupied symbols.

S203a. The network device sends the data channel to the terminal device based on the real value of the starting symbol of the data channel and the real value of the quantity of occupied symbols; and the terminal device receives the data channel.

S203b. The terminal device sends a data channel to the network device based on the real value of the starting symbol of the data channel and the real value of the quantity of occupied symbols; and the network device receives the data channel.

In this embodiment, the starting symbol of the data channel uses a slot boundary as the reference position. Because a service such as a low-latency and high-reliability service requires relatively frequent blind detection on a PDCCH, and the PDCCH may be sent at many occasions, a starting symbol or an ending symbol of the PDCCH, a starting symbol or an ending symbol of a CORESET, or a starting symbol or an ending symbol of a control area may be before the starting symbol of the data channel, or may be after the starting symbol of the data channel. Therefore, there may be a problem that the data channel exists before a control channel, and the terminal device needs to buffer data received before the PDCCH is received.

In this embodiment, the real value of the starting symbol of the data channel and the real value of the quantity of occupied symbols need to be determined based on the configuration value information of the starting symbol that is of the data channel and that is indicated by the PDCCH, the configuration value information of the quantity of occupied symbols, and the reference position of the starting symbol.

First, in S201, the network device sends the configuration value information of the starting symbol of the data channel and the configuration value information of the quantity of occupied symbols to the terminal device. The configuration value information specifically includes an index of the starting symbol of the data channel and the quantity of occupied symbols.

Specifically, S201 includes: sending higher layer signaling to the terminal device, where the higher layer signaling includes at least one set of the index of the starting symbol of the data channel and the quantity of symbols occupied by the data channel; and sending the physical downlink control channel (PDCCH) to the terminal device, where the higher layer signaling and/or the PDCCH are/is configured to indicate a configuration value S of the index of the starting symbol of the data channel and a configuration value L of the quantity of symbols occupied by the data channel.

For example, the higher layer signaling includes a set of an index S1 of a starting symbol and a quantity L1 of occupied symbols. To reduce bit overheads of control information carried on the PDCCH, the PDCCH may not include indication information of the time domain, and the terminal device sends the data channel to the network device by using, by default, the set of the index S1 of the starting symbol and the quantity L1 of occupied symbols that are configured in the higher layer signaling, or demodulates and decodes the received data channel. Alternatively, the PDCCH may include one bit, used to indicate an index of an SLIV. Regardless of whether the PDCCH performs indication, if a time domain resource set includes only one set of the index S1 of the starting symbol and the quantity L1 of occupied symbols, the terminal device may determine that the configuration value S of the index of the starting symbol of the data channel is equal to S1 and the configuration value L of the quantity of symbols occupied by the data channel is equal to L1.

When the higher layer signaling includes at least two sets of indexes of starting symbols and quantities of occupied symbols, an index of a starting symbol indicated by the PDCCH is S2, and a quantity of occupied symbols is L2, the terminal device may determine that the configuration value S of the index of the starting symbol of the data channel is equal to S2 and the configuration value L of the quantity of symbols occupied by the data channel is equal to L2, where S2 and L2 are one set of the at least two sets of the indexes of the starting symbols and the quantities of occupied symbols.

Subsequently, after S201 or S202a (to be specific, after the terminal device receives the data channel sent by the network device), the terminal device determines the real value of the starting symbol of the data channel and the real value of the quantity of occupied symbols based on the configuration value information of the starting symbol of the data channel and the configuration value information of the quantity of occupied symbols. Alternatively, before S202b (to be specific, before the terminal device sends the data channel to the network device), the terminal device may determine the real value of the starting symbol of the data channel and the real value of the quantity of occupied symbols.

Specifically, a real value S(real) of the index of the starting symbol of the data channel and a real value L(real) of the quantity of symbols occupied by the data channel may be determined based on a value relationship between an index T of a starting symbol of the PDCCH and the configuration value S of the index of the starting symbol of the data channel.

In an implementation, when the reference position of the starting symbol is a slot boundary, the network device may configure that when the index T of the starting symbol or the ending symbol of the PDCCH, the starting symbol or the ending symbol of the CORESET, or the starting symbol or the ending symbol of the control area is greater than or equal to the configuration value S of the index of the starting symbol of the data channel, the real value S(real) of the index of the starting symbol of the data channel is equal to the index T of the starting symbol of the PDCCH, and the real value L(real) of the quantity of symbols occupied by the data channel is equal to: the configuration value L of the quantity of symbols occupied by the data channel, or a smaller value between the configuration value L of the quantity of symbols occupied by the data channel and a difference between a quantity of symbols included in one slot and S(real). In other words, the network device sends the PDCCH to indicate the configuration value of the index of the starting symbol of the data channel and the configuration value of the quantity of occupied symbols, and sends the data channel to the terminal device based on the real value of the index of the starting symbol of the data channel and the real value of the quantity of occupied symbols, or receives a data channel from the terminal device based on the real value of the index of the starting symbol of the data channel and the real value of the quantity of occupied symbols.

In other words, the terminal device may determine, based on the reference position of the starting symbol and the PDCCH, that the real value S(real) of the index of the starting symbol of the data channel is the index T of the starting symbol or the ending symbol of the PDCCH, the starting symbol or the ending symbol of the CORESET, or the starting symbol or the ending symbol of the control area; and determine that the real value L(real) of the quantity of symbols occupied by the data channel is: the configuration value L of the quantity of symbols occupied by the data channel, or a smaller value between the configuration value L of the quantity of symbols occupied by the data channel and a difference between a quantity of symbols included in one slot and S(real). That is, L(real) may be the configuration value L, or may be determined based on S(real): a smaller value between the configuration value L of the quantity of symbols occupied by the data channel and a difference between the quantity of symbols included in one slot and S(real). In addition, the terminal device demodulates and decodes the data channel based on the real value of the index of the starting symbol of the data channel and the real value of the quantity of symbols occupied by the data channel.

In another implementation, when the reference position of the starting symbol is a slot boundary, the network device may configure that when the index T of the starting symbol or the ending symbol of the PDCCH, the starting symbol or the ending symbol of the CORESET, or the starting symbol or the ending symbol of the control area is less than or equal to the configuration value S of the index of the starting symbol of the data channel, the real value S(real) of the index of the starting symbol of the data channel is equal to the configuration value S of the index of the starting symbol of the data channel, and the real value L(real) of the quantity of symbols occupied by the data channel is equal to the configuration value L of the quantity of symbols occupied by the data channel.

The terminal device may determine, based on the reference position of the starting symbol and the PDCCH, that the real value S(real) of the index of the starting symbol of the data channel is equal to the configuration value S of the index of the starting symbol of the data channel, and the real value L(real) of the quantity of symbols occupied by the data channel is equal to the configuration value L of the quantity of symbols occupied by the data channel; and demodulate and decode the data channel based on the real value of the index of the starting symbol of the data channel and the real value of the quantity of symbols occupied by the data channel.

In still another implementation, when the reference position of the starting symbol is a slot boundary, the network device may configure that when the index T of the starting symbol or the ending symbol of the PDCCH, the starting symbol or the ending symbol of the CORESET, or the starting symbol or the ending symbol of the control area is less than or equal to the configuration value S of the index of the starting symbol of the data channel, the real value S(real) of the index of the starting symbol of the data channel is equal to the index T of the starting symbol or the ending symbol of the PDCCH, the starting symbol or the ending symbol of the CORESET, or the starting symbol or the ending symbol of the control area, and the real value L(real) of the quantity of symbols occupied by the data channel is equal to the configuration value L of the quantity of symbols occupied by the data channel.

In this case, the terminal device may determine, based on the reference position of the starting symbol and the PDCCH, that the real value S(real) of the index of the starting symbol of the data channel is equal to the index T of the starting symbol of the PDCCH, and the real value L(real) of the quantity of symbols occupied by the data channel is equal to the configuration value L of the quantity of symbols occupied by the data channel; and demodulate and decode the data channel based on the real value of the index of the starting symbol of the data channel and the real value of the quantity of symbols occupied by the data channel.

In the foregoing implementations, an indicated slot boundary is used as the reference position. By comparing the configuration value of the index of the starting symbol of the PDCCH with the configuration value of the index of the starting symbol of the data channel, the real value of the index of the starting symbol of the data channel and the real value of the quantity of symbols occupied by the data channel can be accurately determined. Therefore, the data channel is sent accurately, or the received data channel is demodulated and decoded.

According to the communication method provided in this embodiment of this application, the network device sends the reference position of the starting symbol, the configuration value information of the starting symbol, and the configuration value information of the quantity of occupied symbols, so that the terminal device can accurately determine the real value of the starting symbol of the data channel and the real value of the quantity of occupied symbols. In this way, the data channel can be sent or received at an accurate time domain position.

In NR, a starting resource block ($RB_{start}$) and a quantity ($L_{RBs}$) of consecutive RBs in frequency domain are indicated by using a resource indication value (RIV). The RIV is related to a quantity $N_{BWP}^{size}$ of resource blocks (RB) included in a downlink bandwidth part (BWP), $L_{RBs}$, and $RB_{start}$. If a frequency domain resource is indicated by using the RIV, a quantity of required bits is $\lceil \log_2(N_{BWP}^{size}(N_{BWP}^{size}+1)/2) \rceil$. If the BWP bandwidth is 100 RBs, ii bits are required. In this case, a relatively large quantity of bits are required.

For a URLLC service that has a relatively high reliability requirement, reliability of a PDCCH also needs to be ensured. To improve reliability of a control channel, one method is to reduce a quantity of bits of the PDCCH. Therefore, an indicator field that can be compressed and that is of the PDCCH, for example, a frequency domain indicator field, needs to be compressed.

Therefore, the embodiments of this application further provide still another communication method and communications apparatus. A frequency domain resource indication value of a data channel is enabled to be related to a quantity of resource block groups in a bandwidth part, so that bit overheads for sending the frequency domain resource indication value can be reduced, thereby improving reliability of the PDCCH.

Figure 5:
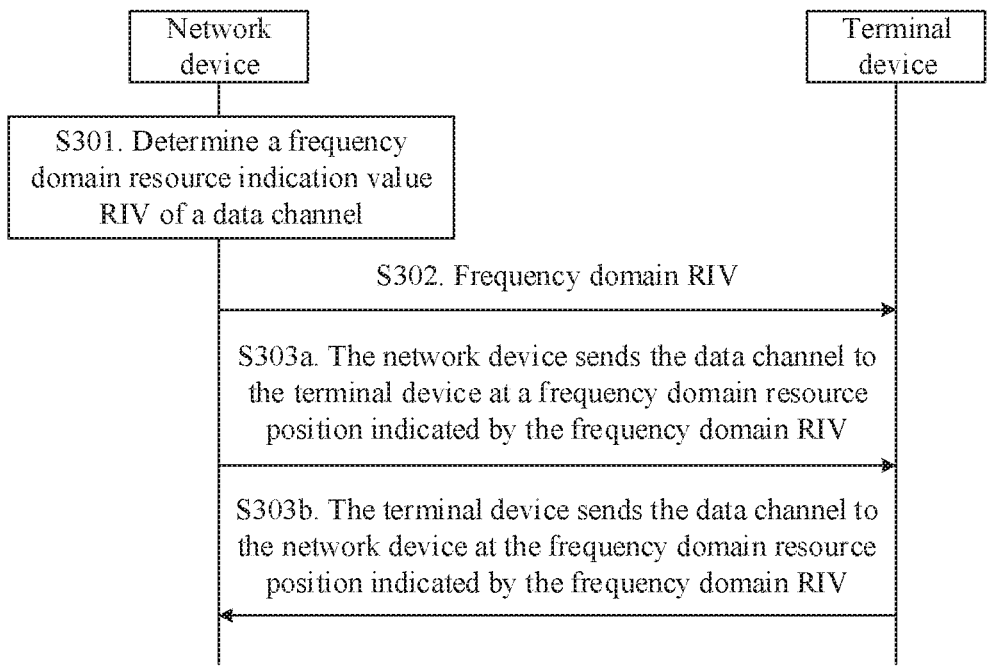
FIG. 5 is a schematic interaction flowchart of still another communication method according to an embodiment of this application.

FIG. 5 is a schematic flowchart of another communication method according to an embodiment of this application. The method may include the following steps.

S301. A network device determines a frequency domain RIV of a data channel, where the RIV is used to indicate a frequency domain resource position of the data channel, the RIV is related to a quantity $N_{BWP}^{RGB}$ of resource block groups (RBG) in a bandwidth part BWP, and $N_{BWP}^{RGB}$ is related to a quantity $N_{BWP}^{size}$ of RBs included in the BWP and an RBG size P.

S302. The network device sends the frequency domain RIV to a terminal device; and the terminal device receives the frequency domain RIV.

S303a. The network device sends the data channel to the terminal device at a frequency domain resource position indicated by the frequency domain RIV; and the terminal device receives the data channel at the frequency domain resource position.

S303b. The terminal device sends a data channel to the network device at the frequency domain resource position indicated by the frequency domain RIV; and the network device receives the data channel at the frequency domain resource position.

The network device sends a PDCCH to the terminal device. The PDCCH includes indication information of a frequency domain resource, and may further include indication information of a time domain resource, an MCS, and the like. This embodiment mainly relates to indication of the frequency domain resource.

The network device first determines the frequency domain RIV. In this embodiment, the RIV is related to the quantity $N_{BWP}^{RGB}$ of RBGs in the BWP, and $N_{BWP}^{RGB}$ is related to the quantity $N_{BWP}^{size}$ of RBs included in the BWP and the size P of the RBG. That is, resource allocation is performed at a granularity of an RBG. The size of the RBG may be a quantity of RBs included in one RBG.

Specifically, the frequency domain RIV may be determined by using the following formula 2:

if $(L_{RBG}-1) \leq \lfloor N_{BWP}^{RBG}/2 \rfloor$, then $$RIV = N_{BWP}^{RGP}(L_{RBG}-1) + RBG_{start}$$

else $$RIV = N_{BWP}^{RGP}(N_{BWP}^{RGP} - L_{RBG}+1) + (N_{BWP}^{RGP}-1-RBG_{start})$$  Formula 2 where $L_{RBG}$ represents a quantity of RBGs occupied by a frequency domain of a data channel, and $L_{RBG} \geq 1$; $N_{BWP}^{RGP} = \lceil N_{BWP}^{size}/P \rceil$, and represents a quantity of RBGs in a BWP; $N_{BWP}^{size}$ is a quantity of RBs included in the BWP, and P is an RBG size, namely, a quantity of RBs included in one RBG; $RBG_{start}$ is a starting RBG number of the frequency domain of the data channel; and $L_{RBG} \leq N_{BWP}^{RGP} - RBG_{start}$.

If the quantity of RBs included in the BWP is a value known to the terminal device, $N_{BWP}^{RGP}$ is mainly related to the RBG size. Therefore, the RIV is also mainly related to the RBG size.

The following describes in detail how to determine the RBG size.

In an implementation, the method further includes: sending first indication information to the terminal device, where the first indication information is used to indicate one of at least two RBG sizes corresponding to a range of the quantity of RBs included in the BWP.

For example, the network device determines the size P of the RBG based on Table 2, and sends the first indication information to the terminal device to indicate a value of P. Table 2 below shows an example of a correspondence between a range of a quantity of RBs included in a BWP and an RBG size.

TABLE 2

| Range of the quantity of RBs | RBG size | |
| included in the BWP | Configuration 1 | Configuration 2 |
| --- | --- | --- |
| 1 to 36 | 2 | 4 |
| 37 to 72 | 4 | 8 |
| 73 to 144 | 8 | 16 |
| 145 to 275 | 16 | 16 |

As shown in Table 2, the range of the quantity of RBs included in each BWP corresponds to two configurations of the RBG size. During specific scheduling, the network device determines, based on the range of the quantity of RBs included in the BWP, two configurations of the RBG size that correspond to the range of the quantity of RBs included in the BWP; and then determines, according to a scheduling policy, a configured RBG size to be used for scheduling, and sends the indication information to the terminal device to indicate a specific RBG size used for scheduling. For example, if the quantity of RBs included in the BWP is 100 RBs, it is determined that the quantity of RBs included in the BWP is within the range of 73 RBs to 144 RBs. Then, because a URLLC service is scheduled, and a relatively small quantity of bits that the frequency domain resource needs to indicate is required, a relatively large RBG may be selected, that is, RBG=16 is selected. Then, the network device sends the indication information to indicate that the RBG size used by the terminal device is the configuration 2. The terminal device may determine, based on the quantity of RBs included in the BWP and the indicated RBG size being the configuration 2, that the RBG size is 16 RBs. The network device may send the first indication information to the terminal device, where the indication information includes at least one bit, to indicate the value of P.

The correspondence in Table 2 may be specified in a protocol, or may be configured for the terminal device by using system information or higher layer signaling.

Further, in another implementation, to further reduce the quantity of bits that is indicated by the frequency domain resource indication, the RBG size may be set to a larger value. For example, Table 3 shows an example of another correspondence between a range of a quantity of RBs included in a BWP and an RBG size. The RBG size in Table 3 is increased compared with the configuration of the RBG size in Table 2.

TABLE 3

| Range of the quantity of RBs | RBG size | |
| included in the BWP | Configuration 1 | Configuration 2 |
| --- | --- | --- |
| 1 to 36 | 4 | 8 |
| 37 to 72 | 8 | 16 |
| 73 to 144 | 16 | 32 |
| 145 to 275 | 32 | 32 |

The correspondence in Table 3 may be specified in a protocol, or may be configured for the terminal device by using system information or higher layer signaling.

In the foregoing two implementations, the RBG size is configurable. Configuring a large RBG can effectively reduce the quantity of bits of the PDCCH (mainly the frequency domain resource indicator), thereby improving PDCCH transmission reliability. In addition, when a service packet is relatively small, a relatively small RBG may be configured, to reduce a waste of frequency domain resources.

In still another implementation, P is a size of a first RBG corresponding to the range of the quantity of RBs included in the BWP. The size of the first RBG may be defined according to a protocol.

For example, when scheduling data transmission, the network device always uses the RBG size in the configuration 1 or the configuration 2 in Table 2 or Table 3. In this case, the network device may not need to send the indication information to the terminal device, and the terminal device may determine the RBG size based on the range of the quantity of RBs included in the BWP. For example, if the network device uses the RBG size in the configuration 2 in Table 2, and the BWP includes 100 RBs, it is determined that the quantity of RBs included in the BWP is within the range of 73 RBs to 144 RBs, and it may be determined that the RBG size is 16 RBs.

In still another implementation, the range of the quantity of RBs included in each BWP corresponds to one RBG size.

Table 4 shows an example of still another correspondence between a range of a quantity of RBs included in a BWP and an RBG size. As shown in Table 4, a range of a quantity of RBs included in each BWP corresponds to one RBG size.

TABLE 4

| Range of the quantity of RBs included in the BWP | RBG size Configuration 1 |
| --- | --- |
| 1 to 36 | 8 |
| 37 to 72 | 16 |
| 73 to 144 | 32 |
| 145 to 275 | 32 |

The correspondence in Table 4 may be configured by using higher layer signaling, or may be specified by using a protocol.

A range of a quantity of RBs included in each BWP corresponds to one RBG size. There is no need to set the range of the quantity of RBs included in each BWP to corresponding to a plurality of RBG sizes, and one RBG size corresponding to the range of the quantity of RBs included in each BWP may be set relatively large. Therefore, a frequency domain resource indication value is reduced, and bit overheads for indicating a frequency domain resource are reduced. In addition, the RBG size may be directly determined based on the range of the quantity of RBs included in the BWP, and no additional indication information is required, thereby reducing signaling overheads.

In addition, to further reduce the quantity of bits indicated by the frequency domain resource, the RBG size may be configured to be slightly larger. In this way, the quantity of bits of the PDCCH can be effectively reduced, thereby improving PDCCH transmission reliability. In addition, an RBG size corresponding to the range of the quantity of RBs included in each BWP is specified in a protocol in advance. The network device may not need to additionally notify the terminal device of the used RBG size, and the terminal device may determine the corresponding RBG size based on the quantity of RBs included in the BWP, thereby reducing signaling overheads.

In still another implementation, P is a fixed value predefined in a protocol, for example, fixed to 8, 16, or 32, and is irrelevant to the range of the quantity of RBs included in each BWP. Therefore, implementation is simple. The protocol may be a third generation partnership project (3GPP) protocol.

For example, the protocol specifies that P=16. By using the foregoing resource allocation method and fixedly setting the RBG to a relatively large size, the quantity of bits of the PDCCH can be effectively reduced, thereby improving reliability of the PDCCH. In addition, a size of the RBG does not need to be notified of, so that signaling overheads can be reduced. In addition, P may alternatively be 8, 32, or the like.

In still another implementation, the method further includes: sending P to the terminal device.

The network device determines the RBG size P. P may be selected by the network device. By sending configuration information to the terminal device, the terminal device is notified of the size P.

According to the foregoing resource allocation method, the RBG size is configurable. Therefore, a large RBG is configured to effectively reduce the quantity of bits of the PDCCH, thereby improving reliability of the PDCCH. In addition, when a service packet is relatively small, a small RBG may be configured, to reduce a waste of resources.

According to the communication method provided in this embodiment of this application, the frequency domain resource indication value of the data channel is enabled to be related to the quantity of resource block groups in the bandwidth part, so that bit overheads for sending the frequency domain resource indication value can be reduced, thereby improving reliability of the PDCCH.

The method in the embodiments of the present invention is described above in detail, and an apparatus in an embodiment of the present invention is provided below.

Figure 6:
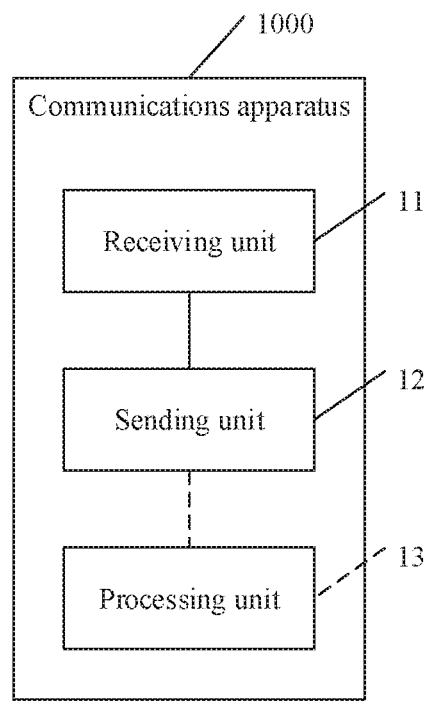
FIG. 6 is a schematic structural diagram of a communications apparatus according to an embodiment of this application.

Based on a same concept as that of the communication method in the foregoing embodiments, as shown in FIG. 6, an embodiment of this application further provides a communications apparatus 1000. The communications apparatus may be applied to the communication method shown in FIG. 3. The communications apparatus 1000 may be the terminal device 200 shown in FIG. 2, or may be a component (for example, a chip) applied to the terminal device 200. The communications apparatus 1000 includes a receiving unit 11 and a sending unit 12, and may further include a processing unit 13.

The receiving unit 11 is configured to receive first indication information from a network device, where the first indication information is used to indicate a reference position of a starting symbol of a data channel.

The receiving unit 11 is further configured to receive a physical downlink control channel PDCCH from the network device.

The sending unit 12 is configured to send the data channel to the network device based on the first indication information and the PDCCH.

The receiving unit 11 is further configured to receive the data channel from the network device based on the first indication information and the PDCCH.

In an implementation, the receiving unit 11 is further configured to receive higher layer signaling from the network device, where the higher layer signaling includes at least one set of an index of a starting symbol of a data channel and a quantity of symbols occupied by the data channel.

In another implementation, the processing unit 13 is further configured to: when the higher layer signaling includes one set of an index S1 of a starting symbol and a quantity L1 of occupied symbols, determine that a configuration value S of an index of the starting symbol of the data channel is equal to S1 and a configuration value L of a quantity of symbols occupied by the data channel is equal to L1; or when the higher layer signaling includes at least two sets of indexes of starting symbols and quantities of occupied symbols, determine that a configuration value S of an index of a starting symbol indicated by the PDCCH is equal to S2 and a configuration value L of a quantity of symbols occupied by the data channel is equal to L2, where the index S2 of the starting symbol and the quantity L2 of occupied symbols are one set of the at least two sets of the indexes of the starting symbols and the quantities of occupied symbols.

In still another implementation, the reference position is a slot boundary; and the processing unit 13 is further configured to: when an index T of the starting symbol of the PDCCH is greater than or equal to the configuration value S of the index of the starting symbol of the data channel, determine that a real value S(real) of the index of the starting symbol of the data channel is equal to the index T of the starting symbol of the PDCCH, and a real value L(real) of the quantity of symbols occupied by the data channel is equal to: the configuration value L of the quantity of symbols occupied by the data channel, or a smaller value between the configuration value L of the quantity of symbols occupied by the data channel and a difference between a quantity of symbols included in one slot and S(real); and demodulate and decode the data channel based on the real value of the index of the starting symbol of the data channel and the real value of the quantity of symbols occupied by the data channel.

In still another implementation, the reference position is a slot boundary; and the processing unit 13 is further configured to: when an index T of the starting symbol of the PDCCH is less than or equal to the configuration value S of the index of the starting symbol of the data channel, determine that a real value S(real) of the index of the starting symbol of the data channel is equal to the configuration value S of the index of the starting symbol of the data channel, and a real value L(real) of the quantity of symbols occupied by the data channel is equal to the configuration value L of the quantity of symbols occupied by the data channel; and demodulate and decode the data channel based on the real value of the index of the starting symbol of the data channel and the real value of the quantity of symbols occupied by the data channel.

In still another implementation, the reference position is a slot boundary; and the processing unit 13 is further configured to: when an index T of the starting symbol of the PDCCH is less than or equal to the configuration value S of the index of the starting symbol of the data channel, determine that a real value S(real) of the index of the starting symbol of the data channel is equal to the index T of the starting symbol of the PDCCH, and a real value L(real) of the quantity of symbols occupied by the data channel is equal to the configuration value L of the quantity of symbols occupied by the data channel; and demodulate and decode the data channel based on the real value of the index of the starting symbol of the data channel and the real value of the quantity of symbols occupied by the data channel.

For more detailed descriptions of the receiving unit 11, the sending unit 12, and the processing unit 13, directly refer to related descriptions of the terminal device in the method embodiment shown in FIG. 3, and details are not described herein again.

Figure 7:
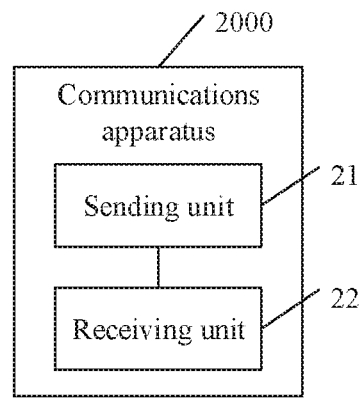
FIG. 7 is a schematic structural diagram of another communications apparatus according to an embodiment of this application.

Based on a same concept as that of the communication method in the foregoing embodiments, as shown in FIG. 7, an embodiment of this application further provides a communications apparatus 2000. The communications apparatus may be applied to the communication method shown in FIG. 3. The communications apparatus 2000 may be the network device 100 shown in FIG. 2, or may be a component (for example, a chip) applied to the network device 100. The communications apparatus 2000 includes a sending unit 21 and a receiving unit 22.

The sending unit 21 is configured to send first indication information to a terminal device, where the first indication information is used to indicate a reference position of a starting symbol of a data channel.

The sending unit 21 is further configured to send a physical downlink control channel PDCCH to the terminal device.

The sending unit 21 is configured to send the data channel to the terminal device.

The receiving unit 22 is configured to receive a data channel from the terminal device.

In an implementation, the sending unit 21 is further configured to send higher layer signaling to the terminal device, where the higher layer signaling includes at least one set of an index of a starting symbol of a data channel and a quantity of symbols occupied by the data channel.

For more detailed descriptions of the sending unit 21 and the receiving unit 22, directly refer to related descriptions of the network device in the method embodiment shown in FIG. 3, and details are not described herein again.

Figure 8:
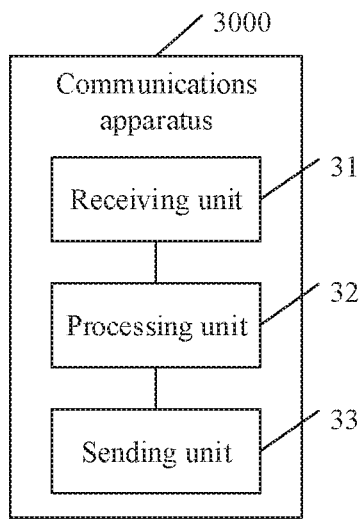
FIG. 8 is a schematic structural diagram of still another communications apparatus according to an embodiment of this application.

Based on a same concept as that of the communication method in the foregoing embodiments, as shown in FIG. 8, an embodiment of this application further provides a communications apparatus 3000. The communications apparatus may be applied to the communication method shown in FIG. 4. The communications apparatus 3000 may be the terminal device 200 shown in FIG. 2, or may be a component (for example, a chip) applied to the terminal device 200. The communications apparatus 3000 includes a receiving unit 31, a processing unit 32, and a sending unit 33.

The receiving unit 31 is configured to receive configuration value information of a starting symbol of a data channel and configuration value information of a quantity of occupied symbols from a network device.

The processing unit 32 is configured to determine a real value of the starting symbol of the data channel and a real value of the quantity of occupied symbols based on the configuration value information of the starting symbol of the data channel and the configuration value information of the quantity of occupied symbols. The sending unit 33 is configured to send the data channel to the network device based on the real value of the starting symbol of the data channel and the real value of the quantity of occupied symbols.

The receiving unit 31 is further configured to receive the data channel from the network device based on the real value of the starting symbol of the data channel and the real value of the quantity of occupied symbols.

For more detailed descriptions of the receiving unit 31, the processing unit 32, and the sending unit 33, directly refer to related descriptions of the terminal device in the method embodiment shown in FIG. 4, and details are not described herein again.

Figure 9:
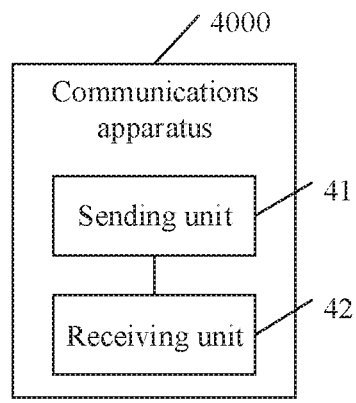
FIG. 9 is a schematic structural diagram of still another communications apparatus according to an embodiment of this application.

Based on a same concept as that of the communication method in the foregoing embodiments, as shown in FIG. 9, an embodiment of this application further provides a communications apparatus 4000. The communications apparatus may be applied to the communication method shown in FIG. 4. The communications apparatus 4000 may be the network device 100 shown in FIG. 2, or may be a component (for example, a chip) applied to the network device 100. The communications apparatus 4000 includes a sending unit 41 and a receiving unit 42. The sending unit 41 is configured to send configuration value information of a starting symbol of a data channel and configuration value information of a quantity of occupied symbols to a terminal device.

The sending unit 41 is further configured to send the data channel to the terminal device.

The receiving unit 42 is configured to receive a data channel from the terminal device.

In an implementation, the sending unit 41 is configured to send higher layer signaling to the terminal device, where the higher layer signaling includes at least one set of an index of the starting symbol of the data channel and a quantity of symbols occupied by the data channel; and the sending unit 41 is further configured to send a physical downlink control channel PDCCH to the terminal device, where the higher layer signaling and/or the PDCCH are/is configured to indicate a configuration value S of the index of the starting symbol of the data channel and a configuration value L of the quantity of symbols occupied by the data channel.

For more detailed descriptions of the sending unit 41 and the receiving unit 42, directly refer to related descriptions of the network device in the method embodiment shown in FIG. 4, and details are not described herein again.

Figure 10:
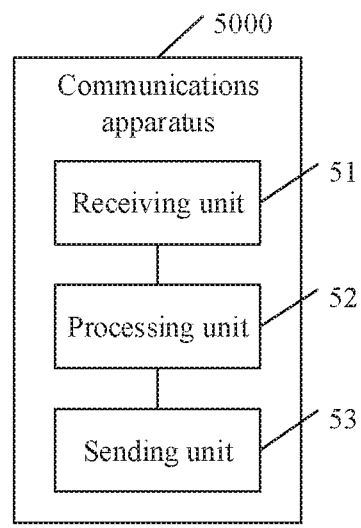
FIG. 10 is a schematic structural diagram of still another communications apparatus according to an embodiment of this application.

Based on a same concept as that of the communication method in the foregoing embodiments, as shown in FIG. 10, an embodiment of this application further provides a communications apparatus 5000. The communications apparatus may be applied to the communication method shown in FIG. 5. The communications apparatus 5000 may be the terminal device 200 shown in FIG. 2, or may be a component (for example, a chip) applied to the terminal device 200. The communications apparatus 5000 includes a receiving unit 51, a processing unit 52, and a sending unit 53.

The receiving unit 51 is configured to receive a frequency domain resource indication value RIV of a data channel from a network device, where the RIV is used to indicate a frequency domain resource position of the data channel, the RIV is related to a quantity $N_{BWP}^{RGP}$ of resource block groups RBGs in a bandwidth part BWP, and $N_{BWP}^{RGP}$ is related to a quantity $N_{BWP}^{size}$ of RBs included in the BWP and an RBG size P.

The processing unit 52 is configured to determine a frequency domain resource position of the data channel based on the RIV.

The receiving unit 51 is further configured to receive the data channel from the network device at the frequency domain resource position.

The sending unit 53 is configured to send a data channel to the network device at the frequency domain resource position.

In an implementation, the receiving unit 51 is further configured to receive first indication information from the network device, where the first indication information is used to indicate one of at least two RBG sizes corresponding to a range of the quantity of RBs included in the BWP.

In another implementation, the receiving unit 51 is further configured to receive P from the network device.

In still another implementation, the processing unit 52 is configured to determine the RIV by using the following formula:

if $(L_{RBG}-1) \leq \lfloor N_{BWP}^{RBG}/2 \rfloor$, then $$RIV = N_{BWP}^{RGP}(L_{RBG}-1) + RBG_{start}$$

else $$RIV = N_{BWP}^{RGP}(N_{BWP}^{RGP} - L_{RBG}+1) + (N_{BWP}^{RGP}-1-RBG_{start})$$

where $L_{RBG}$ represents a quantity of RBGs occupied by a frequency domain of a data channel, and $L_{RBG} \geq 1$; $N_{BWP}^{RGP} = \lceil N_{BWP}^{size}/P \rceil$, and represents a quantity of RBGs in a BWP; $N_{BWP}^{size}$ is a quantity of RBs included in the BWP, and P is an RBG size, namely, a quantity of RBs included in one RBG; $RBG_{start}$ is a starting RBG number of the frequency domain of the data channel; and $L_{RBG} \leq N_{BWP}^{RGP} - RBG_{start}$.

For more detailed descriptions of the receiving unit 51, the processing unit 52, and the sending unit 53, directly refer to related descriptions of the terminal device in the method embodiment shown in FIG. 5, and details are not described herein again.

Figure 11:
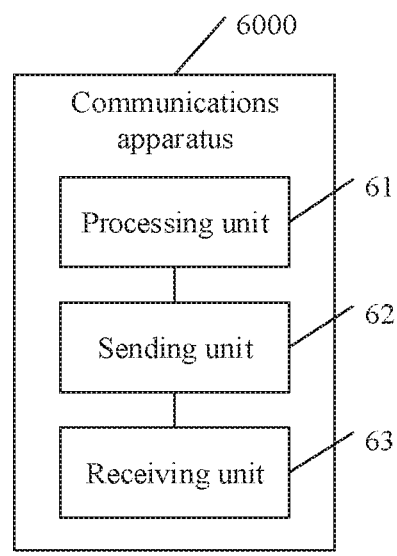
FIG. 11 is a schematic structural diagram of still another communications apparatus according to an embodiment of this application.

Based on a same concept as that of the communication method in the foregoing embodiment, as shown in FIG. 11, an embodiment of this application further provides a communications apparatus 6000. The communications apparatus may be applied to the communication method shown in FIG. 5. The communications apparatus 6000 may be the network device 100 shown in FIG. 2, or may be a component (for example, a chip) applied to the network device 100. The communications apparatus 6000 includes a processing unit 61, a sending unit 62, and a receiving unit 63.

The processing unit 61 is configured to determine a frequency domain resource indication value RIV of a data channel, where the RIV is used to indicate a frequency domain resource position of the data channel, the RIV is related to a quantity $N_{BWP}^{RGP}$ of resource block groups RBGs in a bandwidth part BWP, and $N_{BWP}^{RGP}$ is related to a quantity $N_{BWP}^{size}$ of RBs included in the BWP and an RBG size P.

The sending unit 62 is configured to send the RIV to a terminal device.

The sending unit 62 is further configured to send the data channel to the terminal device at the frequency domain resource position indicated by the RIV.

The receiving unit 63 is configured to receive a data channel from the terminal device at the frequency domain resource position.

In an implementation, the sending unit 62 is further configured to send first indication information to the terminal device, where the first indication information is used to indicate one of at least two RBG sizes corresponding to a range of the quantity of RBs included in the BWP.

In another implementation, the sending unit 62 is further configured to send P to the terminal device.

In still another implementation, the processing unit 61 is configured to determine the RIV by using the following formula:

if $(L_{RBG}-1) \leq \lfloor N_{BWP}^{RBG}/2 \rfloor$, then $$RIV = N_{BWP}^{RGP}(L_{RBG}-1) + RBG_{start}$$

else $$RIV = N_{BWP}^{RGP}(N_{BWP}^{RGP} - L_{RBG}+1) + (N_{BWP}^{RGP}-1-RBG_{start})$$

where $L_{RBG}$ represents a quantity of RBGs occupied by a frequency domain of a data channel, and $L_{RBG} \geq 1$; $N_{BWP}^{RGP} = \lceil N_{BWP}^{size}/P \rceil$, and represents a quantity of RBGs in a BWP; $N_{BWP}^{size}$ is a quantity of RBs included in the BWP, and P is an RBG size, namely, a quantity of RBs included in one RBG; $RBG_{start}$ is a starting RBG number of the frequency domain of the data channel; and $L_{RBG} \leq N_{BWP}^{RGP} - RBG_{start}$.

For more detailed descriptions of the processing unit 61, the sending unit 62, and the receiving unit 63, directly refer to related descriptions of the network device in the method embodiment shown in FIG. 5, and details are not described herein again.

An embodiment of this application further provides a communications apparatus.

The communications apparatus is configured to perform the foregoing communication methods. Some or all of the foregoing communication methods may be implemented by using hardware, or may be implemented by using software.

Optionally, during specific implementation, the communications apparatus may be a chip or an integrated circuit.

Optionally, when some or all of the communication methods in the foregoing embodiments are implemented by using software, the communications apparatus includes: a memory, configured to store a program; and a processor, configured to execute the program stored in the memory, so that when the program is executed, the communications apparatus is enabled to implement the communication methods provided in the foregoing embodiments.

Optionally, the memory may be a physically independent unit, or may be integrated with the processor.

Optionally, when some or all of the communication methods in the foregoing embodiments are implemented by using software, the communications apparatus may alternatively include only a processor. A memory configured to store a program is located outside the communications apparatus. The processor is connected to the memory by using a circuit/wire, and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory may include a volatile memory, for example, a random-access memory (RAM). The memory may alternatively include a non-volatile memory, for example, a flash memory, a hard disk drive (HDD), or a solid-state drive (SSD). The memory may alternatively include a combination of the foregoing types of memories.

Figure 12:
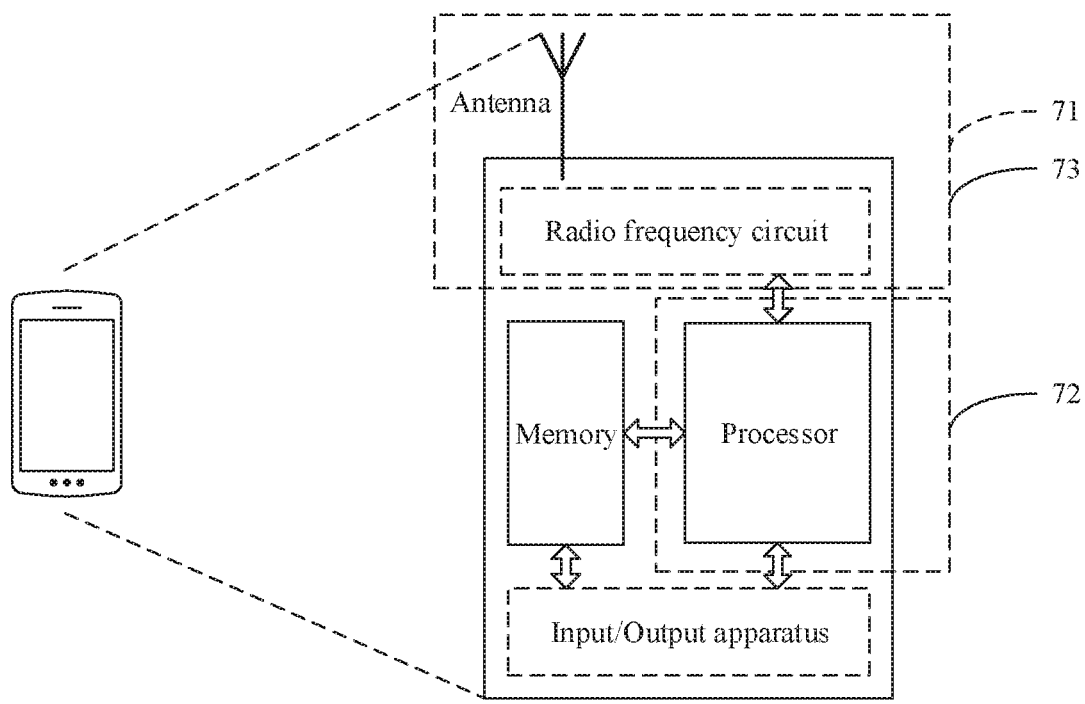
FIG. 12 is a simplified schematic structural diagram of a terminal device according to an embodiment of this application.

FIG. 12 is a simplified schematic structural diagram of a terminal device. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to: process a communications protocol and communications data, control the terminal device, execute a software program, process data of the software program, and so on. The memory is mainly configured to store a software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave by using the antenna. When data is sent to the terminal device, the radio frequency circuit receives a radio frequency signal through the antenna, converts the radio frequency signal into a baseband signal, and outputs the baseband signal to the processor; and the processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a receiving unit and a sending unit (which may also be collectively referred to as a transceiver unit) of the terminal device, and the processor having a processing function may be considered as a processing unit of the terminal device. As shown in FIG. 12, the terminal device includes a receiving unit 71, a processing unit 72, and a sending unit 73. The receiving unit 71 may also be referred to as a receiver, a receiver machine, a receiver circuit, or the like. The sending unit 73 may also be referred to as a transmitter, a transmitting device, a transmitter machine, a transmitting circuit, or the like. The processing unit may also be referred to as a processor, a processing board, a processing module, a processing apparatus, or the like.

For example, in an embodiment, the receiving unit 71 is configured to perform functions of the terminal device in steps S101, S102, and S103a in the embodiment shown in FIG. 3; and the sending unit 73 is configured to perform a function of the terminal device in step S103b in the embodiment shown in FIG. 3.

For another example, in another embodiment, the receiving unit 71 is configured to perform functions of the terminal device in steps S201 and S203a in the embodiment shown in FIG. 4; the processing unit 72 is configured to perform step S202 in the embodiment shown in FIG. 4; and the sending unit 73 is configured to perform a function of the terminal device in step S203b in the embodiment shown in FIG. 4.

For another example, in still another embodiment, the receiving unit 71 is configured to perform functions of the terminal device in steps S302 and S303a in the embodiment shown in FIG. 5; and the sending unit 73 is configured to perform a function of the terminal device in step S303b in the embodiment shown in FIG. 5.

Figure 13:
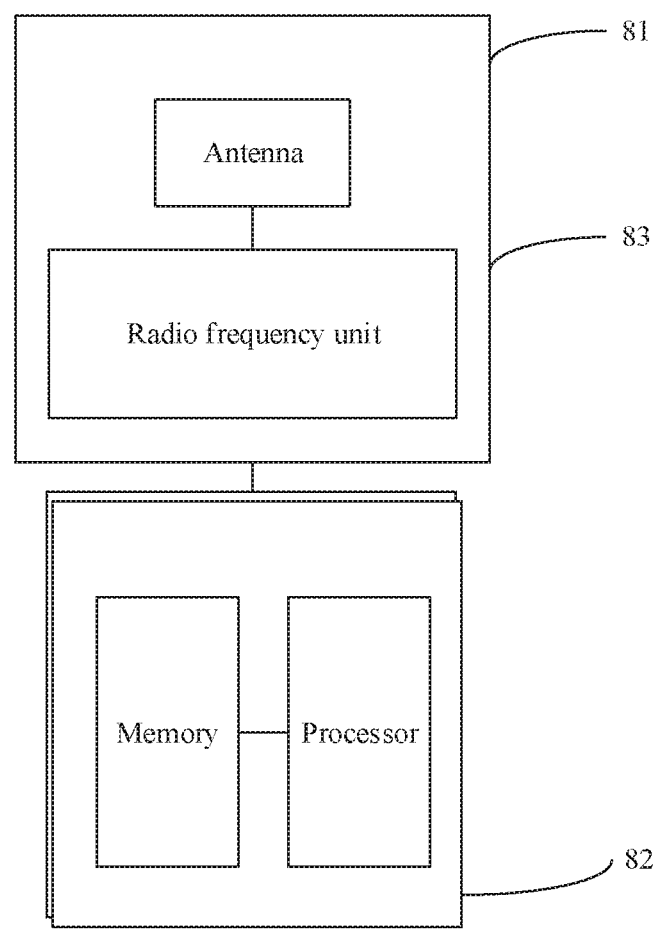
FIG. 13 is a simplified schematic structural diagram of a network device according to an embodiment of this application.

FIG. 13 is a simplified schematic structural diagram of a network device. The network device includes a part 82 and a part for radio frequency signal receiving/sending and conversion. The part for radio frequency signal receiving and sending and conversion further includes a receiving unit 81 and a sending unit 83 (which may also be collectively referred to as a transceiver unit). The part for radio frequency signal receiving/sending and conversion is mainly configured to: send/receive a radio frequency signal and perform conversion between a radio frequency signal and a baseband signal. The part 82 is mainly configured to perform baseband processing, control the network device, and so on. The receiving unit 81 may also be referred to as a receiver, a receiver machine, a receiving circuit, or the like. The sending unit 83 may also be referred to as a transmitter, a transmitting device, a transmitter machine, a transmitting circuit, or the like. The part 82 is usually a control center of the network device, and may usually be referred to as a processing unit, configured to control the network device to perform steps performed by the network device in FIG. 3, FIG. 4, or FIG. 5. For details, refer to the foregoing descriptions of the related parts.

The part 82 may include one or more boards. Each board may include one or more processors and one or more memories. The processor is configured to read and execute a program in the memory to implement a baseband processing function and control the network device. If there are a plurality of boards, the boards may be interconnected to enhance a processing capability. In an optional implementation, alternatively, the plurality of boards may share one or more processors, or the plurality of boards share one or more memories.

For example, in an embodiment, the sending unit 83 is configured to perform functions of the network device in steps S101, S102, and S103a in the embodiment shown in FIG. 3; and the receiving unit 81 is configured to perform a function of the network device in step S103b in the embodiment shown in FIG. 3.

For another example, in another embodiment, the sending unit 83 is configured to perform functions of the network device in steps S201 and S203a in the embodiment shown in FIG. 4; and the receiving unit 81 is configured to perform a function of the network device in step S203b in the embodiment shown in FIG. 4.

For another example, in still another embodiment, the processing unit 82 is configured to perform step S301 in the embodiment shown in FIG. 5; the sending unit 83 is configured to perform functions of the network device in steps S302 and S303a in the embodiment shown in FIG. 5; and the receiving unit 81 is configured to perform a function of the network device in step S303b in the embodiment shown in FIG. 5.

A person skilled in the art may clearly understand that for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the unit division is merely logical function division and there may be another division during actual implementation. For example, a plurality of units or components may be combined or integrated into another system, or some features may be ignored or not performed. In addition, the displayed or discussed mutual couplings, direct couplings, or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer-readable storage medium, or may be transmitted by using a computer-readable storage medium. The computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a read-only memory (ROM), a random access memory (RAM), or a magnetic medium such as a floppy disk, a hard disk, a magnetic tape, a magnetic disk, or an optical medium such as a digital versatile disc (DVD), or a semiconductor medium such as a solid-state disk (SSD).

What is claimed is:

1. A method performed by a communications apparatus, comprising:
   receiving first indication information from a network device, wherein the first indication information indicates a reference position for a starting symbol of a data channel, and the reference position is a slot boundary or a starting symbol of a physical downlink control channel (PDCCH) comprising scheduling information of the data channel;
   receiving the PDCCH from the network device; and
   receiving the data channel from the network device based on the slot boundary or the starting symbol of the received PDCCH, or sending the data channel to the network device based on the slot boundary or the starting symbol of the received PDCCH.

2. The method according to claim 1, wherein the first indication information is associated with a format of downlink control information carried on the PDCCH.

3. The method according to claim 1, further comprising:
   receiving higher layer signaling from the network device, wherein the higher layer signaling comprises at least one group of information, and the at least one group of information comprises a first group of information comprising an index of the starting symbol of the data channel and a quantity of symbols occupied by the data channel.

4. The method according to claim 1, further comprising:
   receiving higher layer signaling from the network device, wherein the higher layer signaling configures a first time domain resource set, the first time domain resource set comprises N start and length indicator values (SLIVs), each SLIV corresponds to one index, and N is the number of SLIVs being a positive integer that is less than or equal to 16.

5. The method according to claim 4, wherein the PDCCH comprises time domain resource indication information, the time domain resource indication information comprising an index corresponding to a SLIV of the N SLIVs, and the SLIV indicating an index of the starting symbol of the data channel and a quantity of symbols occupied by the data channel.

6. An apparatus, comprising:
a non-transitory memory comprising instructions; and
one or more processors coupled to the memory, wherein the one or more processors are configured to execute the instructions to cause the apparatus to:
receive first indication information from a network device, wherein the first indication information indicates a reference position for a starting symbol of a data channel, and the reference position is a slot boundary or a starting symbol of a physical downlink control channel (PDCCH) comprising scheduling information of the data channel;
receive the PDCCH from the network device; and
receive the data channel from the network device based on the slot boundary or the starting symbol of the received PDCCH, or sending the data channel to the network device based on the slot boundary or the starting symbol of the received PDCCH.

7. The apparatus according to claim 6, wherein the first indication information is associated with a format of downlink control information carried on the PDCCH.

8. The apparatus according to claim 6, wherein the one or more processors are configured to execute the instructions to cause the apparatus further to:
receiving higher layer signaling from the network device, wherein the higher layer signaling comprises at least one group of information, and the at least one group of information comprises a first group of information comprising an index of the starting symbol of the data channel and a quantity of symbols occupied by the data channel.

9. The apparatus according to claim 6, wherein the one or more processors are configured to execute the instructions to cause the apparatus further to:
receive higher layer signaling from the network device, wherein the higher layer signaling configures a first time domain resource set, the first time domain resource set comprises N start and length indicator values (SLIVs), each SLIV corresponds to one index, and N is the number of SLIVs being a positive integer that is less than or equal to 16.

10. The apparatus according to claim 9, wherein the PDCCH comprises time domain resource indication information, the time domain resource indication information comprising an index corresponding to a SLIV of the N SLIVs, and the SLIV indicating an index of the starting symbol of the data channel and a quantity of symbols occupied by the data channel.

11. An apparatus, comprising:
a non-transitory memory comprising instructions; and
one or more processors coupled to the memory, wherein the one or more processors are configured to execute the instructions to cause the apparatus to:
send first indication information to a terminal device, wherein the first indication information indicates a reference position for a starting symbol of a data channel, and the reference position is a slot boundary or a starting symbol of a physical downlink control channel (PDCCH) comprising scheduling information of the data channel;
send the PDCCH to the terminal device; and
send the data channel to the terminal device based on the slot boundary or the starting symbol of the sent PDCCH, or receive the data channel from the terminal device based on the slot boundary or the starting symbol of the sent PDCCH.

12. The apparatus according to claim 11, wherein the first indication information is associated with a format of downlink control information carried on the PDCCH.

13. The apparatus according to claim 11, wherein the one or more processors are configured to execute the instructions to cause the apparatus further to:
send higher layer signaling to the terminal device, wherein the higher layer signaling comprises at least one group of information, and the at least one group of information comprises a first group of information comprising an index of the starting symbol of the data channel and a quantity of symbols occupied by the data channel.

14. The apparatus according to claim 11, wherein the one or more processors are configured to execute the instructions to cause the apparatus further to:
send higher layer signaling to the terminal device, wherein the higher layer signaling configures a first time domain resource set, the first time domain resource set comprises N start and length indicator values (SLIVs), each SLIV corresponds to one index, and N is the number of SLIVs being a positive integer that is less than or equal to 16.

15. The apparatus according to claim 14, wherein the PDCCH comprises time domain resource indication information, the time domain resource indication information comprising an index corresponding to a SLIV of the N SLIVs, and the SLIV indicating an index of the starting symbol of the data channel and a quantity of symbols occupied by the data channel.

* * * * *

UNITED STATES PATENT AND TRADEMARK OFFICE
CERTIFICATE OF CORRECTION

PATENT NO. : 11,523,380 B2
APPLICATION NO. : 17/037310
DATED : December 6, 2022
INVENTOR(S) : Ruixiang Ma et al.

It is certified that error appears in the above-identified patent and that said Letters Patent is hereby corrected as shown below:

In the Specification

In the Summary, Column 3, Line 7; delete "L" and insert --L1--.

In the Summary, Column 7, Line 17; delete "NBS" and insert --$N_{BWP}^{RBG}$--.

In the Summary, Column 7, Line 18; delete "N" and insert --$N_{BWP}^{RBG}$--.

In the Summary, Column 7, Line 19; delete "NB" and insert --$N_{BWP}^{size}$--.

In the Summary, Column 8, Lines 45-50; delete "$RIV = N_{BWP}^{RGP}(L_{RBG}-1)+RBG_{start}$
else
$RIV = N_{BWP}^{RGP}(N_{BWP}^{RGP}-L_{RBG}+1)+(N_{BWP}^{RGP}-1-RBG_{start})$"
and insert --
$$RIV = N_{BWP}^{RBG}(L_{RBG} - 1) + RBG_{Start}$$
else
$$RIV = N_{BWP}^{RBG}(N_{BWP}^{RBG} - L_{RBG} + 1) + (N_{BWP}^{RBG} - 1 - RBG_{Start})$$
--.

In the Summary, Column 8, Line 53; delete "$N_{BWP}^{RGP}$" and insert --$N_{BWP}^{RBG}$--.

In the Summary, Column 8, Line 58; delete "$N_{BWP}^{RGP}$" and insert --$N_{BWP}^{RBG}$--.

In the Summary, Column 9, Line 2; delete "$N_{BWP}^{RGP}$" and insert --$N_{BWP}^{RBG}$--.

Signed and Sealed this
Third Day of January, 2023

*Katherine Kelly Vidal*

Katherine Kelly Vidal
*Director of the United States Patent and Trademark Office*

CERTIFICATE OF CORRECTION (continued)
U.S. Pat. No. 11,523,380 B2

In the Summary, Column 9, Line 3; delete "$N_{BWP}^{RGP}$" and insert --$N_{BWP}^{RBG}$--.

In the Summary, Column 9, Lines 56-63; delete "
$$RIV = N_{BWP}^{RGP}(L_{RBG}-1) + RBG_{start}$$
else
$$RIV = N_{BWP}^{RGP}(N_{BWP}^{RGP} - L_{RBG} + 1) + (N_{BWP}^{RGP} - 1 - RBG_{start})$$
"
and insert --
$$RIV = N_{BWP}^{RBG}(L_{RBG} - 1) + RBG_{Start}$$
else
$$RIV = N_{BWP}^{RBG}(N_{BWP}^{RBG} - L_{RBG} + 1) + (N_{BWP}^{RBG} - 1 - RBG_{Start})$$--.

In the Summary, Column 9, Line 66; delete "$N_{BWP}^{RGP}$" and insert --$N_{BWP}^{RBG}$--.

In the Summary, Column 10, Line 4; delete "$N_{BWP}^{RGP}$" and insert --$N_{BWP}^{RBG}$--.

In the Detailed Description of Illustrative Embodiments, Column 22, Line 53; delete "ii" and insert --11--.

In the Detailed Description of Illustrative Embodiments, Column 23, Line 42-51; delete
$$RIV = N_{BWP}^{RGP}(L_{RBG}-1) + RBG_{start}$$
else
$$RIV = N_{BWP}^{RGP}(N_{BWP}^{RGP} - L_{RBG} + 1) + (N_{BWP}^{RGP} - 1 - RBG_{start})$$
" and insert
$$RIV = N_{BWP}^{RBG}(L_{RBG} - 1) + RBG_{Start}$$
else
$$RIV = N_{BWP}^{RBG}(N_{BWP}^{RBG} - L_{RBG} + 1) + (N_{BWP}^{RBG} - 1 - RBG_{Start})$$--.

In the Detailed Description of Illustrative Embodiments, Column 23, Line 54; delete "$N_{BWP}^{RGP}$" and insert --$N_{BWP}^{RBG}$--.

In the Detailed Description of Illustrative Embodiments, Column 23, Line 59; delete "$N_{BWP}^{RGP}$" and insert --$N_{BWP}^{RBG}$--.

In the Detailed Description of Illustrative Embodiments, Column 29, Line 48; delete "$N_{BWP}^{RGP}$" and insert --$N_{BWP}^{RBG}$--.

In the Detailed Description of Illustrative Embodiments, Column 29, Line 49; delete "$N_{BWP}^{RGP}$" and insert --$N_{BWP}^{RBG}$--.

In the Detailed Description of Illustrative Embodiments, Column 30, Lines 5-12; delete "RIV=$N_{BWP}^{RGP}$($L_{RBG}$-1)+$RBG_{start}$ else RIV=$N_{BWP}^{RGP}$($N_{BWP}^{RGP}$-$L_{RBG}$+1)+($N_{BWP}^{RGP}$-1-$RBG_{start}$)" and insert $$RIV = N_{BWP}^{RBG}(L_{RBG} - 1) + RBG_{Start}$$

else $$RIV = N_{BWP}^{RBG}(N_{BWP}^{RBG} - L_{RBG} + 1) + (N_{BWP}^{RBG} - 1 - RBG_{Start})$$--.

In the Detailed Description of Illustrative Embodiments, Column 30, Line 15; delete "$N_{BWP}^{RGP}$" and insert --$N_{BWP}^{RBG}$--.

In the Detailed Description of Illustrative Embodiments, Column 30, Line 20; delete "$N_{BWP}^{RGP}$" and insert --$N_{BWP}^{RBG}$--.

In the Detailed Description of Illustrative Embodiments, Column 30, Line 38; delete "$N_{BWP}^{RGP}$" and insert --$N_{BWP}^{RBG}$--.

In the Detailed Description of Illustrative Embodiments, Column 30, Line 39; delete "$N_{BWP}^{RGP}$" and insert --$N_{BWP}^{RBG}$--.

In the Detailed Description of Illustrative Embodiments, Column 30, Lines 62-67; delete "RIV=$N_{BWP}^{RGP}$($L_{RBG}$-1)+$RBG_{start}$ else RIV=$N_{BWP}^{RGP}$($N_{BWP}^{RGP}$-$L_{RBG}$+1)+($N_{BWP}^{RGP}$-1-$RBG_{start}$)" and insert $$RIV = N_{BWP}^{RBG}(L_{RBG} - 1) + RBG_{Start}$$

else $$RIV = N_{BWP}^{RBG}(N_{BWP}^{RBG} - L_{RBG} + 1) + (N_{BWP}^{RBG} - 1 - RBG_{Start})$$--.

CERTIFICATE OF CORRECTION (continued)
U.S. Pat. No. 11,523,380 B2

In the Detailed Description of Illustrative Embodiments, Column 31, Line 3; delete "$N_{BWP}^{RGP}$" and insert --$N_{BWP}^{RBG}$--.

In the Detailed Description of Illustrative Embodiments, Column 31, Line 8; delete "$N_{BWP}^{RGP}$" and insert --$N_{BWP}^{RBG}$--.